United States Patent [19]

Ishikawa et al.

[11] Patent Number: 5,717,540
[45] Date of Patent: Feb. 10, 1998

[54] MAGNETIC TAPE DRIVE

[75] Inventors: Jun Ishikawa; Masao Matsumoto, both of Tokyo, Japan

[73] Assignee: Sony Corporation, Tokyo, Japan

[21] Appl. No.: 604,807

[22] Filed: Feb. 23, 1996

[30] Foreign Application Priority Data

Feb. 28, 1995 [JP] Japan .................. 7-039620
Feb. 28, 1995 [JP] Japan .................. 7-039621

[51] Int. Cl.$^6$ ............................. G11B 15/00
[52] U.S. Cl. ................................ 360/96.5
[58] Field of Search ................. 360/96.03–96.5, 360/105

[56] References Cited

U.S. PATENT DOCUMENTS

| | | | |
|---|---|---|---|
| 4,378,578 | 3/1983 | Shiozu et al. | 360/96.3 |
| 4,599,662 | 7/1986 | Iwasaki | 360/96.4 |
| 4,680,659 | 7/1987 | Imai | 360/96.3 |
| 4,843,499 | 6/1989 | Ogawa | 360/96.3 |
| 5,402,289 | 3/1995 | Hayaski et al. | 360/105 |
| 5,452,160 | 9/1995 | Sakuma et al. | 360/105 |
| 5,583,719 | 12/1996 | Kunze et al. | 360/105 |

*Primary Examiner*—Allen Cao
*Attorney, Agent, or Firm*—Jay H. Maioli

[57] ABSTRACT

A magnetic tape drive in an auto-reverse tape recorder has a pair of reel-base gears, a pair of capstans, a pair of pinch rollers, a drive mechanism, a switching mechanism, and an oscillating mechanism. The drive mechanism selectively drives one of the pair of reel bases and selectively meshes with a cam gear, and the pair of reel bases has a gear that rotatively drives the reel base gear that is meshed with the cam gear. The switching mechanism switches a running direction of the magnetic tape from a first direction to a second direction, and the switching mechanism is reciprocated when the end of the magnetic tape is reached so that a first pinch roller that is abutting a first capstan moves away from the first capstan and a second pinch roller moves into contact with the second capstan. The switching mechanism has a switching lever that is reciprocated by the oscillating mechanism that includes a first oscillating mechanism that engages a cam portion of the cam gear and that is oscillated by a rotation of the cam gear and a second oscillating mechanism that is oscillated by the first oscillating mechanism so that the switching lever is reciprocated to change the running direction.

10 Claims, 28 Drawing Sheets

MAGNETIC TAPE DRIVE

BACKGROUND OF THE INVENTION

1. Field of the Invention

The present invention relates to a magnetic tape drive, and specifically to a magnetic tape drive which is capable of automatically switching the running direction of a magnetic tape.

2. Background Art

For example, in auto-reverse tape recorders for use in audio-systems, often used is a so-called auto-shut-off mechanism in which a play button can be automatically returned from the pressed position to its initial position as soon as the tape has been wound to the end of the tape (hereinbelow referred to as a "tape end") in a state of single-face playback of the tape in the forward trip (face A) of the tape, i.e., in a state wherein the tape cassette is loaded into the tape recorder such that the face A cooperates with the head or in the backward trip (face B) of the tape, i.e., in a state wherein the tape cassette is loaded into the tape recorder such that the face B cooperates with the head. Also, in the tape recorder, in a double-face playback state for the faces A and B, a so-called auto-direction mechanism in which the forward and backward trips of the tape are automatically reversed or inversed at the end of the magnetic tape. One example of the auto-direction mechanism is shown in FIG. 1. The auto-direction mechanism will be hereinafter explained briefly by reference to FIG. 1. In FIG. 1, reference numeral 200 denotes the auto-direction mechanism which comprises a cam gear 201 having a cam portion 201a projected therefrom and rotated by means of a motor (not shown), a first detection lever 202 rotating in a direction indicated by the arrow P, while engaging with the cam portion 201a of the cam gear 201 when the magnetic tape has been wound up to the end thereof in the double-face playback state (that is, a continuous playback from face A to face B or from face B to face A, or a repeated playback between faces A and B) of the magnetic tape in a tape cassette (not shown), a second detection lever 203 rotating in a direction indicated by the arrow Q by virtue of rotation of the first detection lever 202, an intermediate lever 204 sliding in a direction indicated by the arrow R by virtue of rotation of the second detection lever 203, a substantially C-shaped leaf spring 205 made of metal plate and fixed onto the intermediate lever 204 and provided for restricting the position of the tape end 203a of the second detection lever 203 in preparation for the next reversal motion, a pinch-roller switching lever 207 pivotally pin-supported on the intermediate lever 204 by means of a pin 206 for abutting a pair of pinch rollers (not shown) with a pair of capstans (not shown) in turns, while moving the pair of pinch rollers rightward and leftward, and a direction switching operation lever 209 pivotally pin-supported on the pinch-roller switching lever 207 by means of a pin 208 for manually reversing from one of the forward and backward trips of the tape to the other at the tape end by manually moving an operating portion 209a in its rightward and leftward directions and thus by moving the pinch-roller switching lever 207 in its rightward and leftward directions.

At the tape end, in case that the first detection lever 202 rotates in the direction indicated by the arrow P (clockwise) while the first detection lever 202 runs on the cam portion 201a of the cam gear 201, the second detection lever 203 rotates in the direction indicated by the arrow Q (anti-clockwise). Then, the intermediate lever 204, the pinch-roller switching lever 207 and the direction switching-operation lever 209 are operated in conjunction with each other, with the result that a not-shown gear traveling-direction switching lever (which is provided for switching the gear, which gear can rotate a pair of left and right reel bases alternately, in its leftward or rightward directions), and a not-shown pinch-roller support lever (which is provided for rotatably supporting a pair of pinch rollers) connected to the pinch-roller switching lever 207, are switched respectively, and thus an auto-direction operation is completed.

However, the auto-direction mechanism 200 show in FIG. 1 is so designed that an operational force, transmitted the cam portion 201a of the cam gear 201 to the first detection lever 202, is further transmitted via a large number of levers such as the intermediate lever 204 and the like. The second detection lever 203 is positioned in preparation for the next reversal motion by means of the leaf spring 205 due to the sliding motion of the intermediate lever 204. Therefore, the number of parts and the assembly man-hour are increased, thereby resulting in increase in production costs. Furthermore, it must be required to provide a space large enough to mount the above-noted intermediate lever 204 and the like. Thus, it is difficult to satisfactorily achieve the saving of the interior space of the entire apparatus and to adequately miniaturize the entire size and dimensions of the apparatus.

SUMMARY OF THE INVENTION

It is, therefore, an object of the present invention to provide a magnetic tape drive which avoids the foregoing disadvantages.

According to the present invention, there is provided a magnetic tape drive including a pair of reel-base gears, a pair of capstans, a pair of pinch rollers, a drive mechanism, a switching mechanism, and an oscillating mechanism. The pair of reel-base gears are provided on a pair of reel bases, respectively engaging with a pair of reels between which a magnetic tape is wound. The pair of capstans drive the magnetic tape in a first running direction and a second running direction opposing the first running direction. The pair of pinch rollers drive the magnetic tape in a selected direction of the first and second running directions, while holding the magnetic tape against the capstans by selectively abutting the pair of capstans, respectively. The pair of pinch rollers are supported so that the pinch roller are moveable toward and away from the pair of capstans, respectively. The drive mechanism selectively drives either one reel base of the pair of reel-base gears. The drive mechanism selectively meshes with a cam gear and the pair of reel-base gears and has a which gear rotatively drives the reel-base gear meshed. The switching mechanism is provided for switching a running direction of the magnetic tape from one of the first and second running direction to another direction. The switching mechanism is reciprocated at the end of the magnetic tape so that a first pinch roller of the pair of pinch rollers which first pinch roller abuts a first capstan of the pair of capstans moves away from the first capstan and so that a second pinch roller of the pair of pinch rollers which second pinch roller is spaced apart from a second capstan of the pair of capstans abuts the second capstan. The Oscillating mechanism reciprocates the switching mechanism by oscillating the oscillating mechanism at the end of the magnetic tape by the cam gear. The gear of the drive mechanism is shifted from one reel-base gear of the pair of reel-base gears to another reel-base gear at the end of the magnetic tape in accordance with a switching operation of the running direction of the magnetic tape. The switching operation is achieved by the switching mechanism.

According to the present invention, there is provided a magnetic tape drive including a pair of capstans, a pair of pinch rollers, a first gear, a second gear, a first switching mechanism, a second switching mechanism, a third mechanism, a first detection mechanism and a second detection mechanism. The pair of capstans runs a magnetic tape in a first running direction of a take-up reel base side or in a second running direction of a supply reel base side, the second running direction opposing the first running direction. The pair of pinch rollers is operated to abut with or move away from the pair of capstans. The first gear rotates one reel base of the take-up reel base and the supply reel base. The second gear has a cam portion for rotating the first gear. The first switching mechanism rotatably supports the first and second gears and moves the first gear toward the above-noted one reel base. The first detection mechanism is provided for engaging with the cam portion of the second gear, detecting a tape end. The second detection mechanism is linked to the first detection mechanism for producing oscillating motion of the second detection mechanism. The second switching mechanism oscillates in a direction essentially equivalent to the first or second running directions by the oscillating motion of the second detection mechanism. The third switching mechanism switches the positions of the pair of pinch rollers so that the pair of pinch rollers abut with and move away from the pair of capstans in turns by reciprocating the third switching mechanism in accordance with the oscillating motion of the second detection mechanism. A selected one of the reel bases is rotatively driven by shifting the first gear, rotatably supported on the first switching mechanism, towards the one reel base in accordance with reciprocating motion of the third switching mechanism.

DESCRIPTION OF THE PREFERRED EMBODIMENTS

The magnetic tape drive of the present invention will be hereinbelow described in detail in accordance with the drawings. The embodiments of the magnetic tape drive made according to the invention are exemplified in case of an auto-reverse magnetic tape recording and/or reproducing apparatus, which will be hereinafter abbreviated to a "tape recorder".

Figure 1:
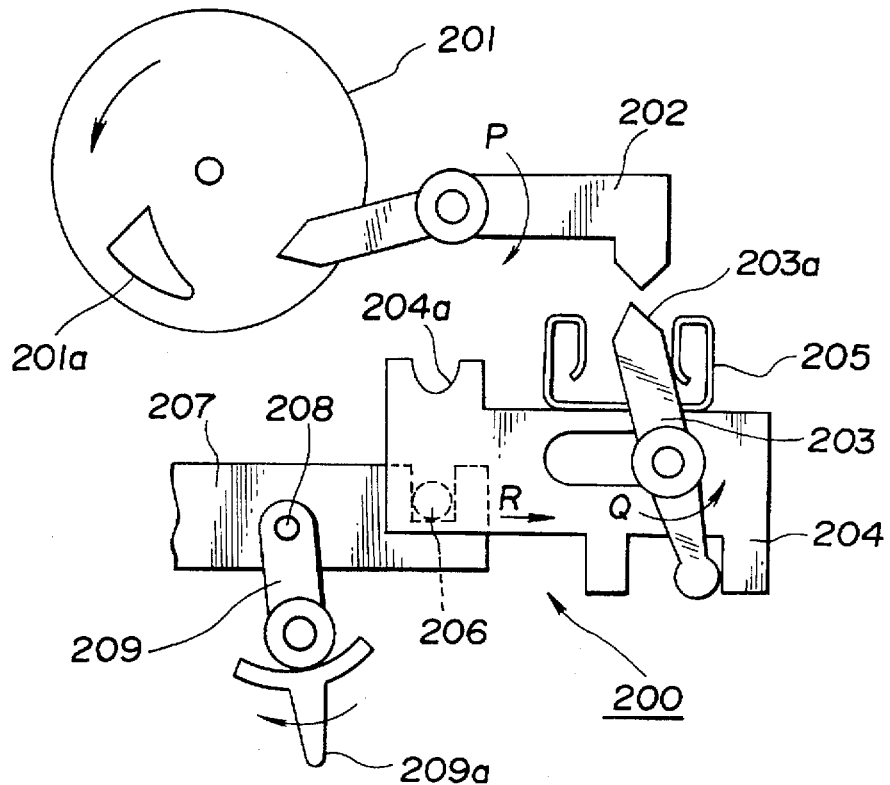
FIG. 1 is a view explaining a switching mechanism which switches the running direction of a magnetic tape.
Figure 2:
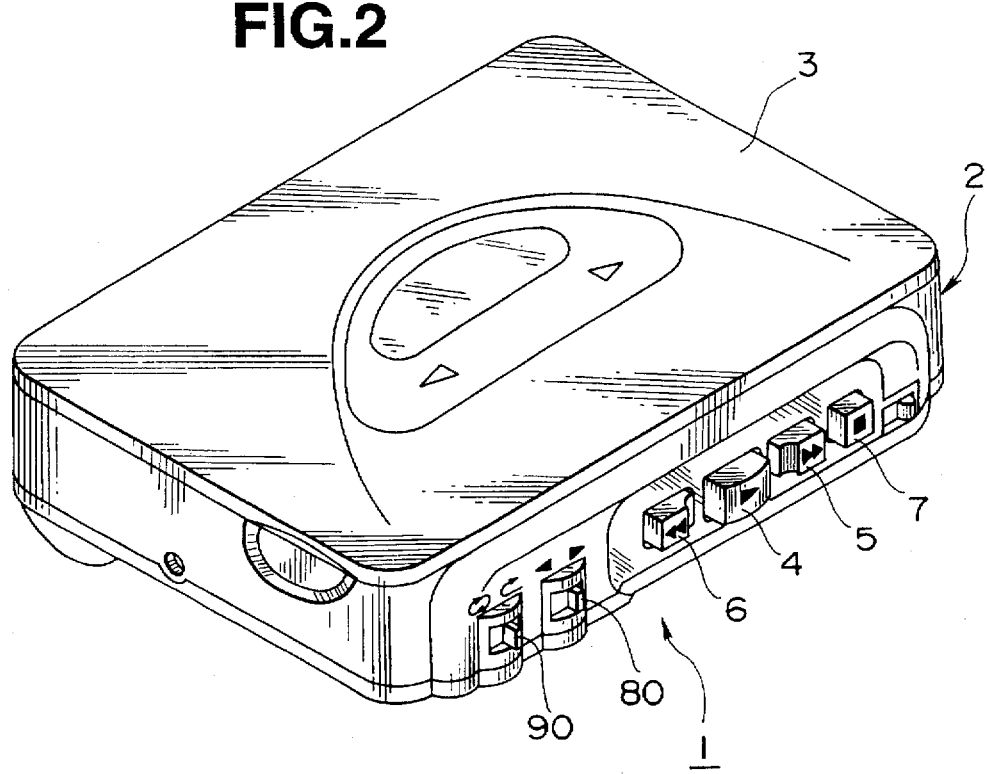
FIG. 2 is a perspective view the appearance of an auto-reverse tape recorder equipped with a magnetic tape drive of illustrating an auto-reverse type tape recorder of one embodiment of the present invention.
Figure 3:
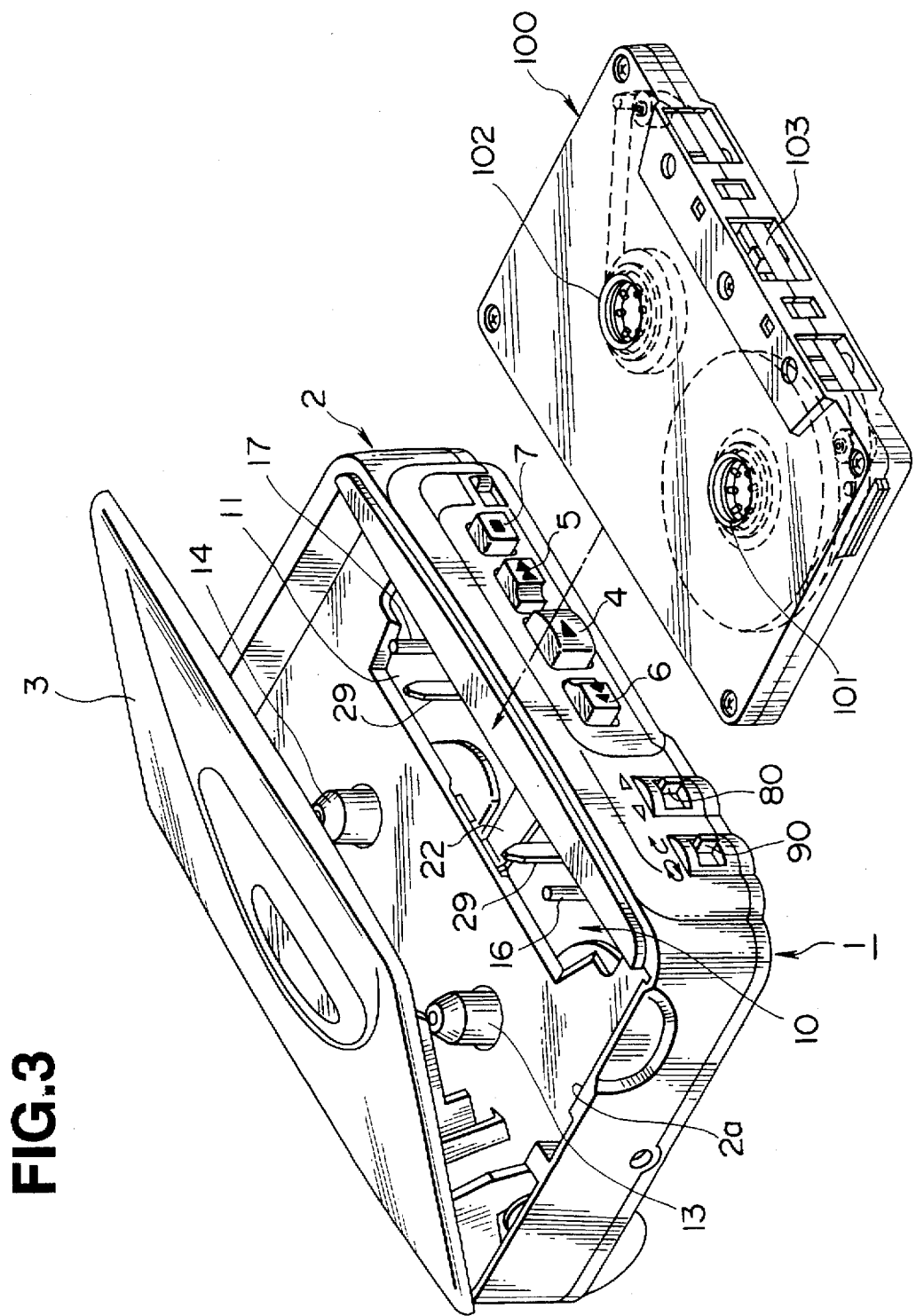
FIG. 3 is a perspective view illustrating a particular state in which the tape cassette is inserted into the interior of the tape recorder shown in FIG. 2 with its lid opened.
Figure 36:
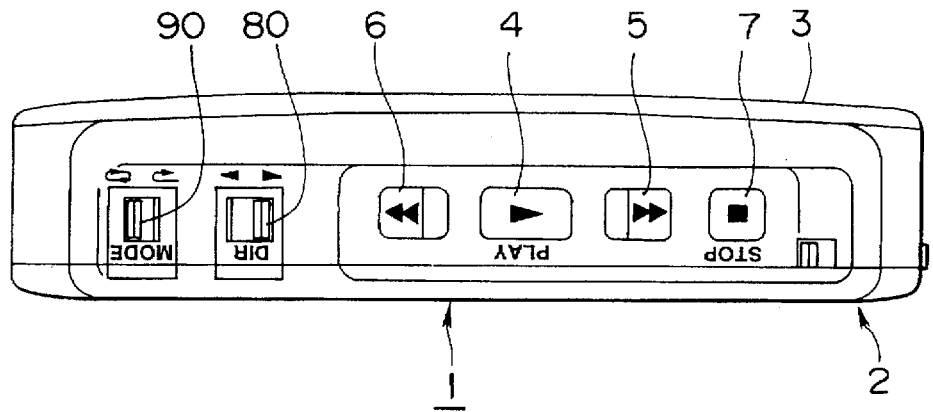
FIG. 36 is a front view illustrating the tape recorder shown in FIG. 2.

In FIGS. 2, 3 and 36, reference numeral 1 denotes an auto-reverse tape recorder for use in audio systems. The tape recorder 1 is equipped with a stereo-headphone connection terminal (not shown) at the right-hand side of a box-like cabinet 2 made of synthetic resin and is portable and small-sized and light-weighted. A lid member 3, which is made of synthetic resin and also serves as a cassette holder, is provided at the upper face of the cabinet 2 to manually open and close an opening 2a of a larger size than the tape cassette 100.

The cabinet 2 accommodates therein a mechanism 10 which is provided for performing a playback of a forward direction which will be hereinafter abbreviated to a "FWD", a playback of a reverse direction which will be hereinafter abbreviated to a "RVS", a stopping operation and the like, with respect to a magnetic tape 103 both ends of which are wound respectively between a pair of reels 101 and 102 of the tape cassette 100. Also provided at the front face of the cabinet 2 are a play button 4 which is pressed in case of the forward playback or reverse-playback of the tape 103, a fast-forward running (FF) button 5 which is pressed in case of fast-forward running of the tape 103, a rewind (REW) button 6 which is pressed in case of re-winding of the tape 103, a stop button 7 which is pressed when stopping the forward playback or the reverse playback of the tape 103, a direction switching operation lever 80 which switches the running direction of the tape 103 into either the forward running direction (FWD) or the reverse running direction (RVS), a mode switching operation lever 90 which switches the playback mode of the tape into either the double-face continuous playback mode for both faces composed of the forward trip (i.e., face A of the tape cassette 100) and the backward trip (i.e., face B of the tape cassette 100) of the tape 103 or the single-face individual playback mode for either one of the faces A and B of the tape cassette 100, and the like. The above-mentioned buttons 4 to 7 and the operation levers 80 and 90 are formed of synthetic resin.

Figure 4:
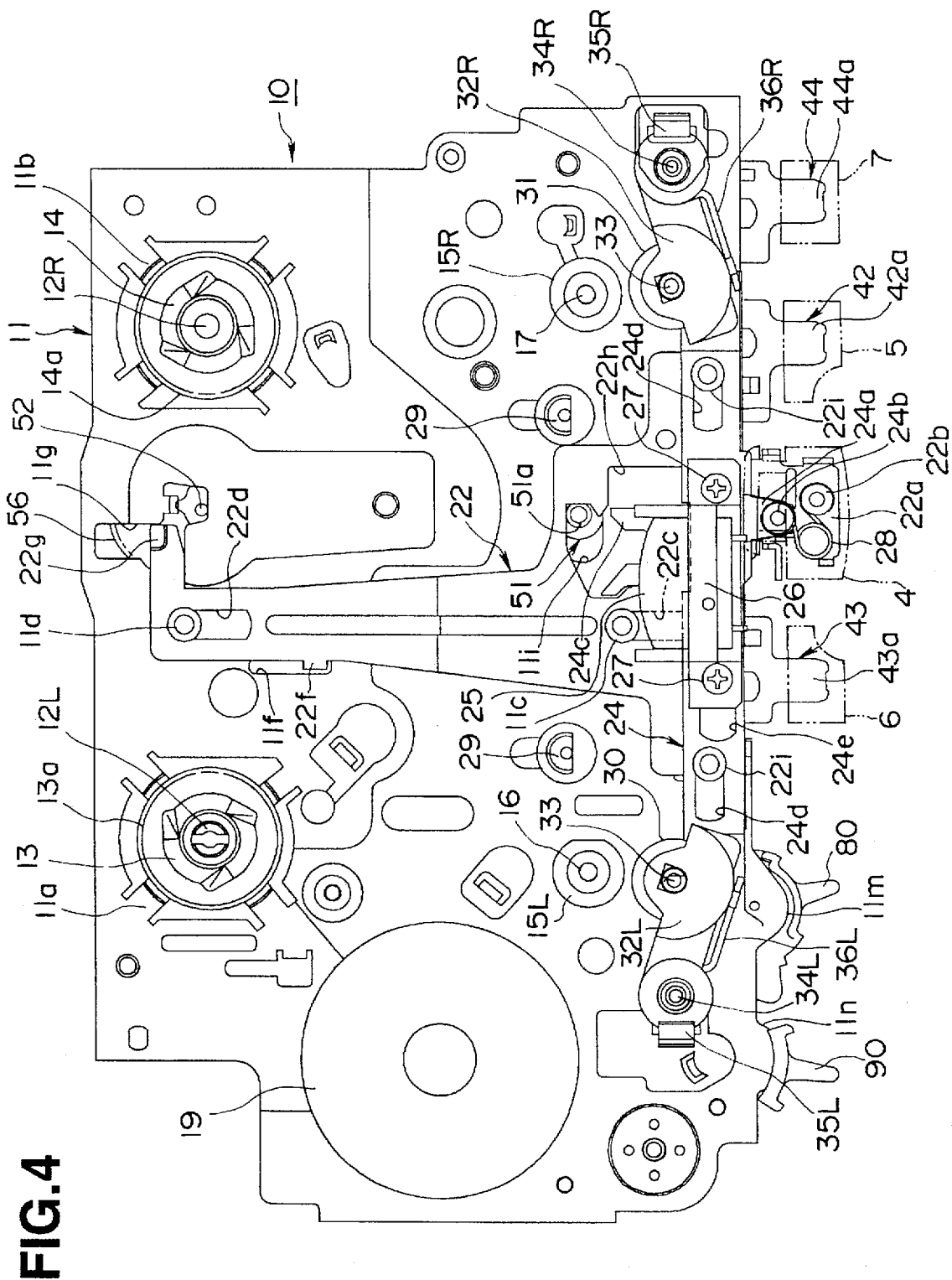
FIG. 4 is a plan view illustrating a mechanism of the tape recorder.
Figure 6:
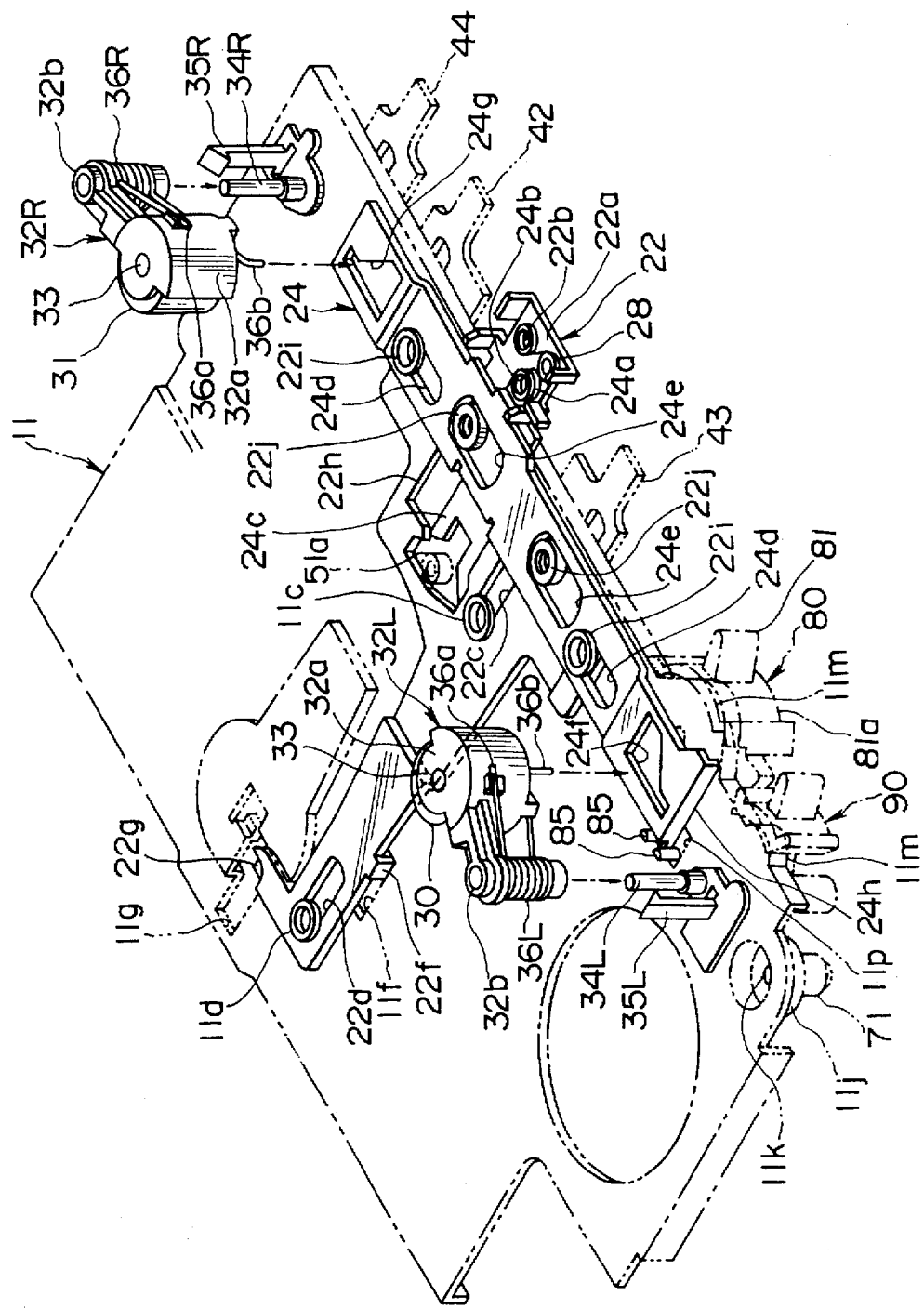
FIG. 6 is a perspective view illustrating the essential portions of the mechanism of the tape recorder.

As shown in FIGS. 4 and 6, the mechanism 10 has a substantially rectangular plate-like chassis 11 made of metal.

Figure 8:
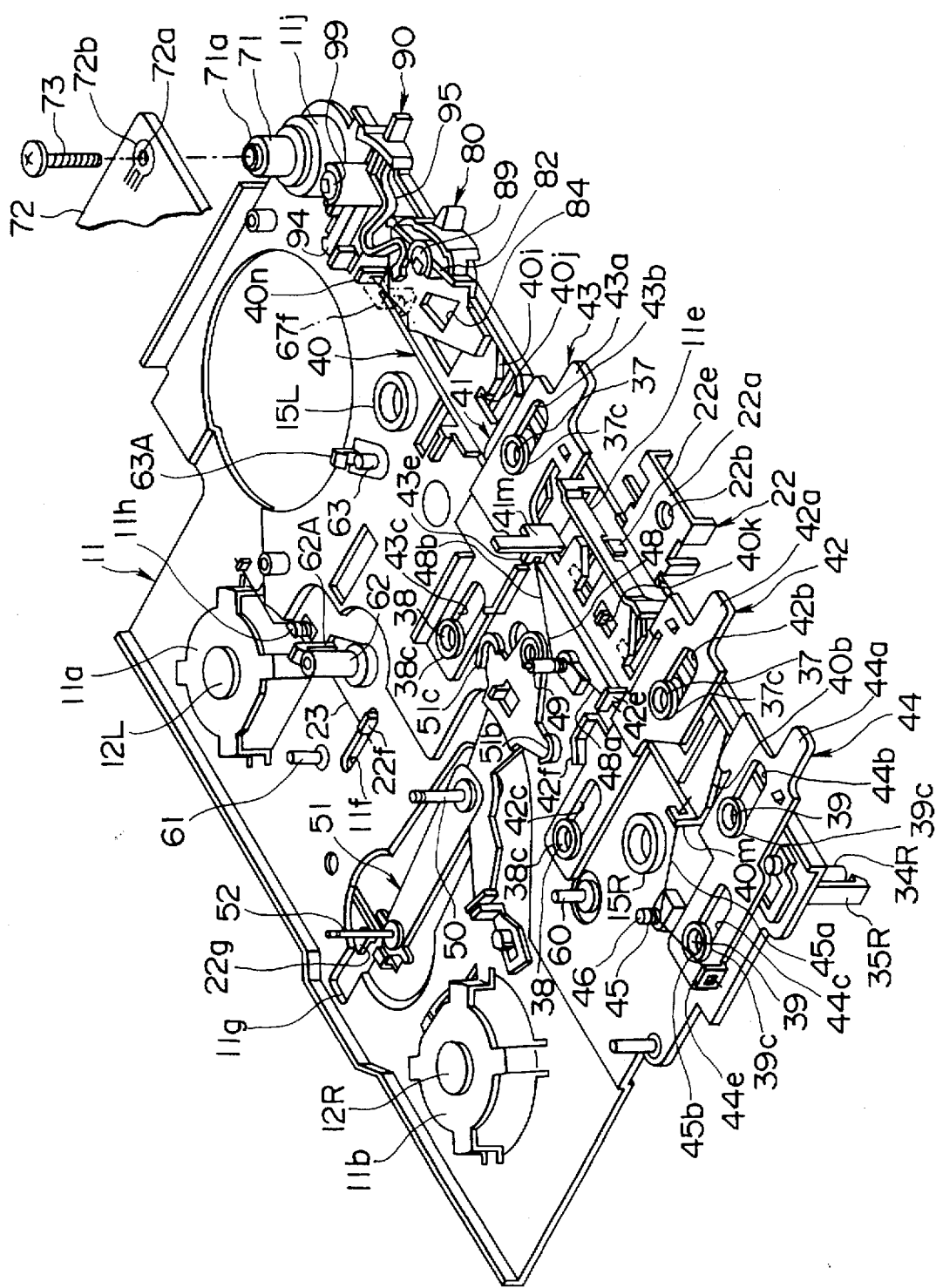
FIG. 8 is a perspective view illustrating the essential portions the mechanism of the tape recorder from the reverse side.

As shown in FIG. 8, in rear of the chassis 11 and at both corners of the chassis, a pair of concavities 11a and 11b, each depressed cylindrically, are formed at the bottom face of the chassis by pressing. The peripheral wall of each of the concavities 11a and 11b is notched into four pieces, and integrally projection-formed at the respective bottoms of the concavities are support shafts 12L and 12R, made of synthetic resin, by way of a so-called outsert molding (a molding method according to which plastic is embedded into a metal part). One support shaft 12L rotatably supports the supply reel base 13 made of synthetic resin, whereas the other support shaft 12R rotatably supports the take-up reel base 14 made of synthetic resin. Disc-like flanged Gears 13a and 14a, each having a large diameter, are integrally molded at the bottoms of the respective reel bases 13 and 14.

Figure 7:
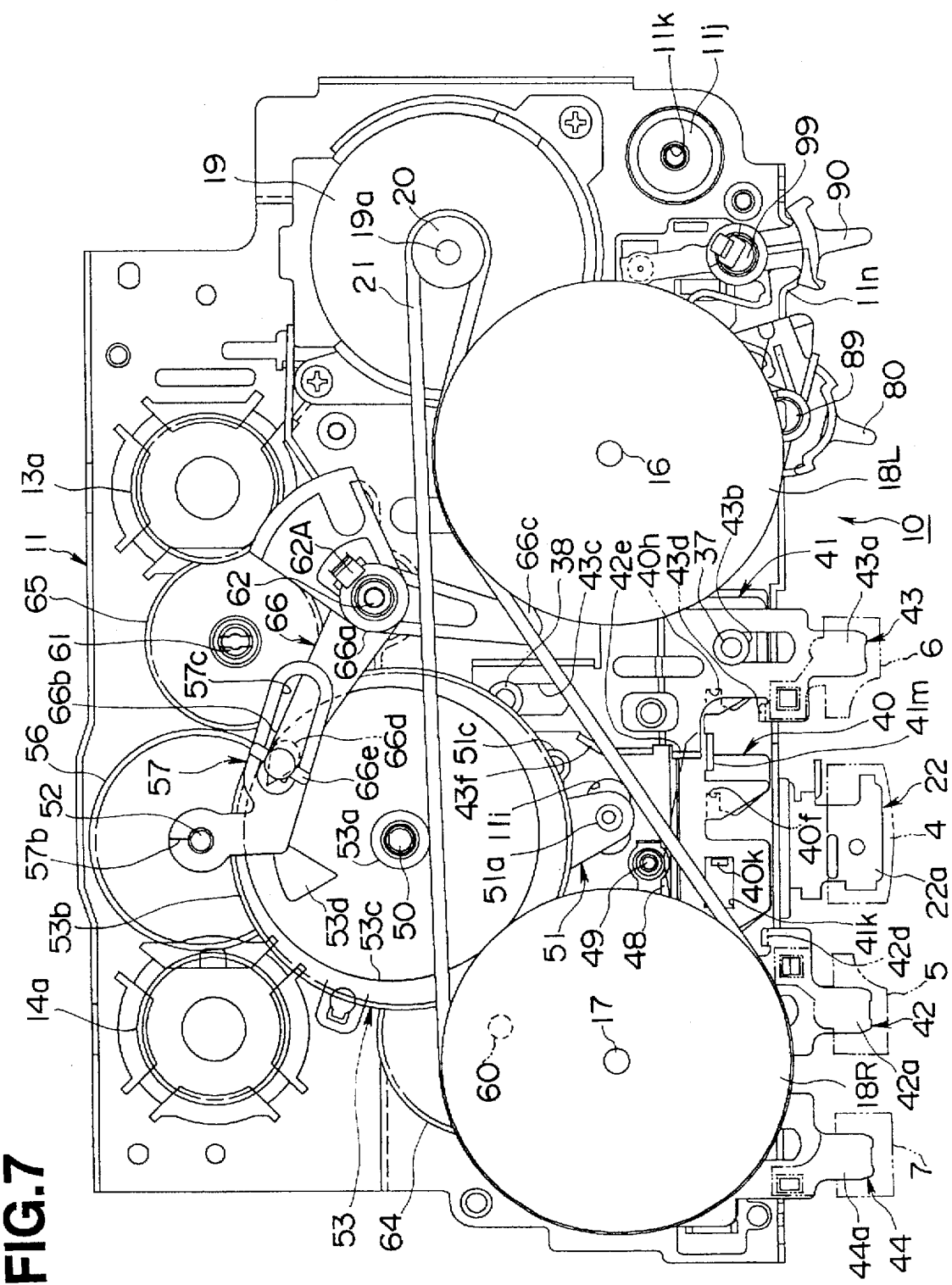
FIG. 7 is a plan view illustrating the mechanism of the tape recorder from the reverse side.
Figure 23:
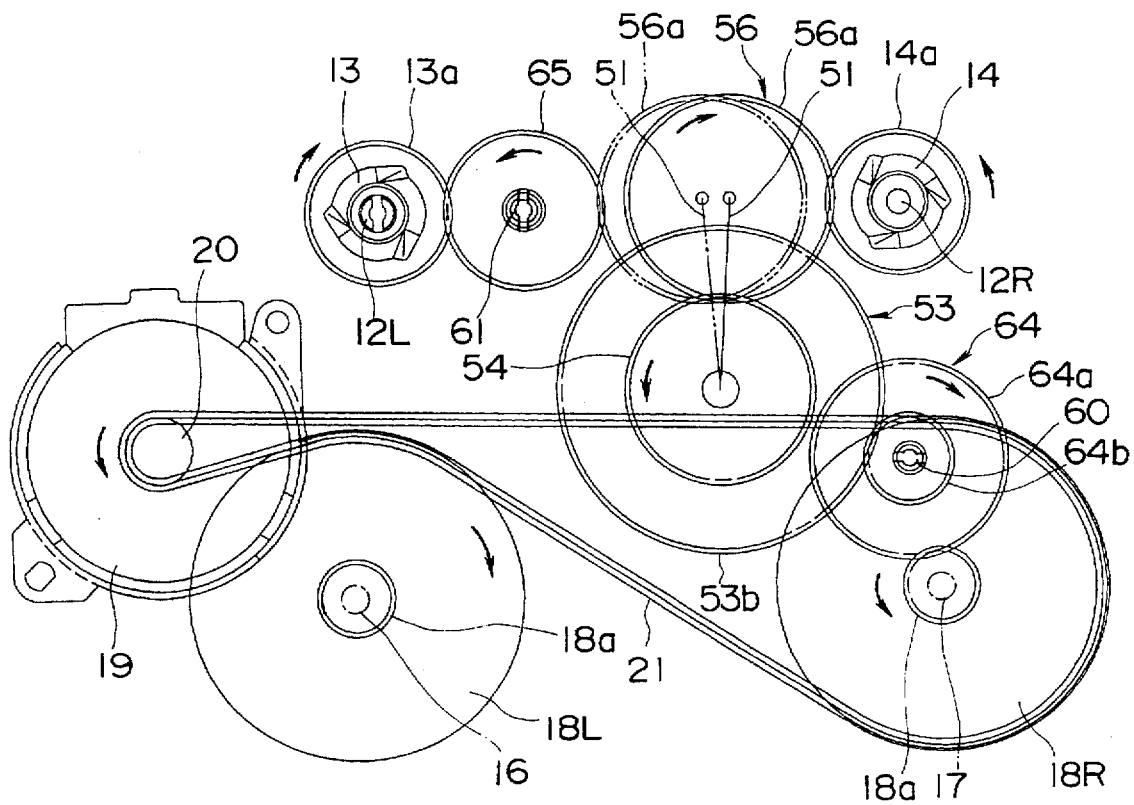
FIG. 23 is a schematic structural view illustrating the operation of the tape drive system when switching from the forward playback running (FWD) mode to the reverse-rotation playback running (RVS) mode.
Figure 32:
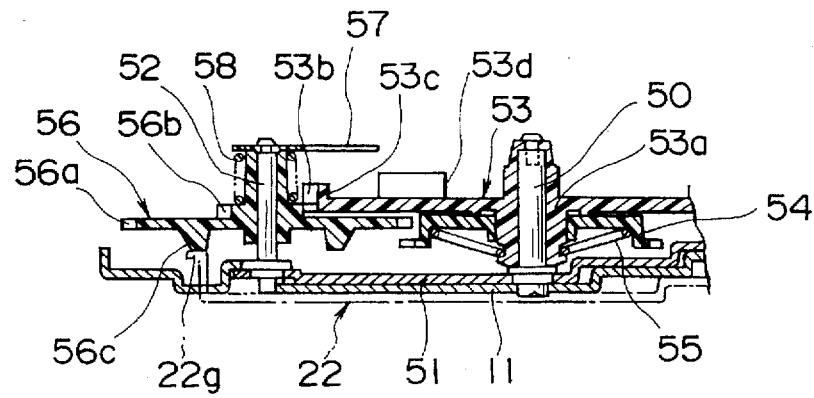
FIG. 32 is a cross-sectional view illustrating the relation between the oscillating gear and the cam gear during stop in the stop mode, the fast-forward running mode, and the rewinding mode.
Figure 33:
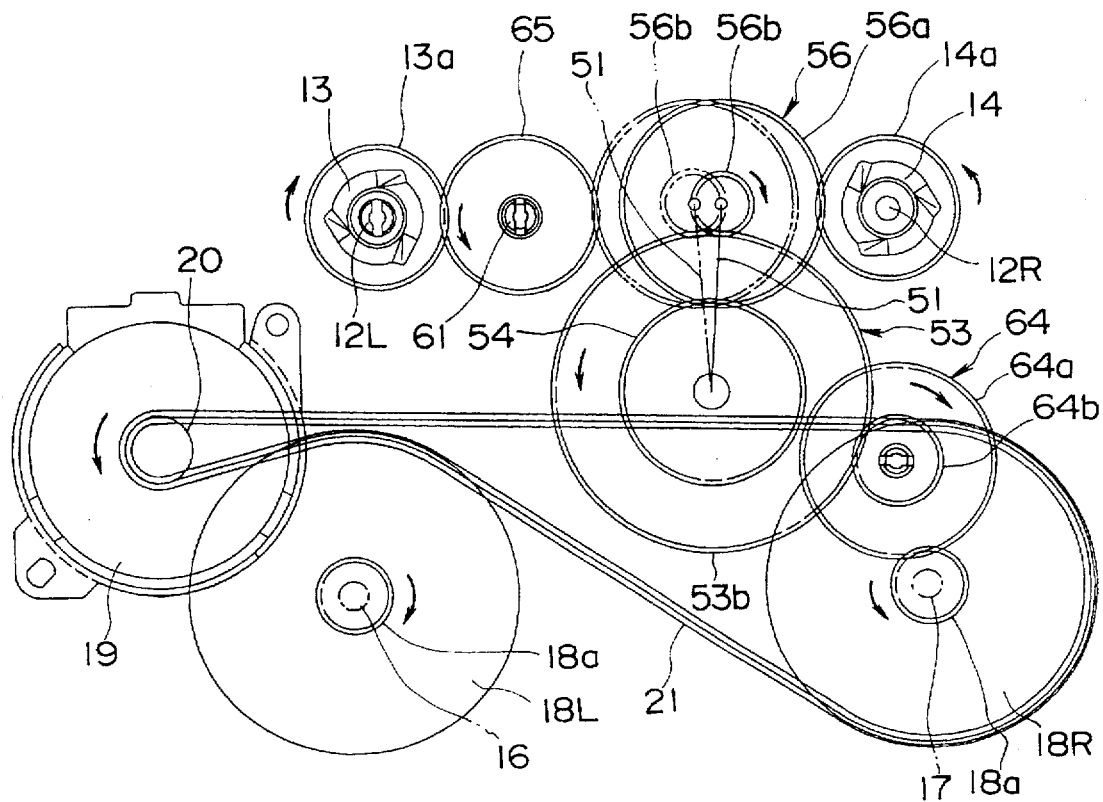
FIG. 33 is a schematic structural view illustrating the operation of the tape drive system during the fast-forward running and during the rewinding.

As shown in FIG. 4, a pair of left and right capstans 16 and 17 are rotatably supported at locations opposing the respective reel bases 13 and 14 and in the front of the chassis 11 by means of a pair of cylindrical bearing portions 15L and 15R which are formed of synthetic resin by way of outsert molding. The lower portions of the pair of capstans 16 and 17 are downwardly projected from the bottom face of the chassis 11, and also driven pulleys 18L and 18R are fixed onto the respective lower portions as seen in FIG. 7. As shown in FIG. 7, a drive belt 21 is provided and tightened among the driven pulleys 18L and 18R, and a drive pulley 20 which is fixed to a drive shaft 19a of a motor 19 serving as a power source, which shaft is mounted in such a manner as to project from the bottom face of the chassis 11. As shown in FIGS. 23 and 32, small-diameter gears 18a, 18a are integrally molded at the respective central portions of the upper faces of the pair of driven pulleys 18L and 18R.

Figure 5:
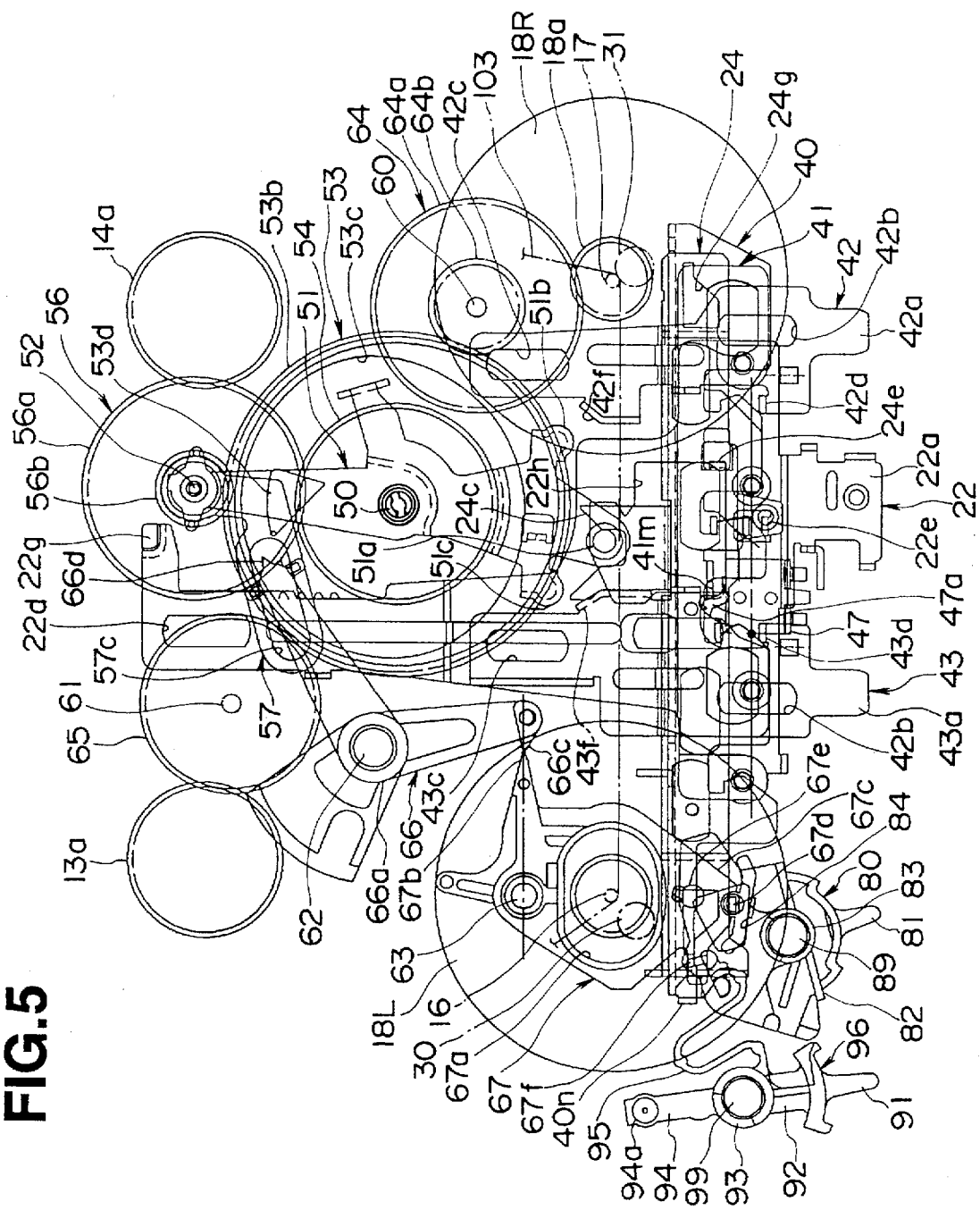
FIG. 5 is a perspective view illustrating essential portions of the mechanism of the tape recorder.

As shown in FIGS. 4 and 5, integrally molded in front and in the rear of the center of the chassis 11 are drawing-pressed portions 11c and 11d each constructing a shaft. The drawing-pressed portions 11c and 11d are formed in such a manner as to be projected from the chassis 11. A substantially cross-shaped playback operation lever 22, made of metal, is supported on the chassis 11 slidably in the longitudinal direction by means of the pair of drawing-pressed portions 11c and 11d. The play button 4 is mounted on the tab-like front portion 22a of the playback operation lever 22. A pair of slots 22c and 22d, which are respectively formed at the center and at the rear of the playback operation lever 22, are inserted into the pair of drawing-pressed portions 11c and 11d. As a result of this the playback operation lever 22 is supported in a manner so as to be slidable in the longitudinal direction by the distance corresponding to the length of the respective slots 22c and 22d. Additionally, the above-noted playback operation lever 22 is slidably supported on and engaged with the chassis 11 by burring top ends of the respective drawing-pressed portions 11c and 11d such that the top ends are flanged outside.

As shown in FIGS. 4, 6 and 8, tab-like bent pieces 22e, 22f and 22g are formed at the tab-like front portion 22a and at the center and at the rear end of the playback operation lever 22, in such a manner as to be bent downwards. The bent pieces 22e, 22f and 22g are so located that these bent pieces are projected downwardly from the bottom face of the chassis 11 through the holes 11e, 11f and 11g formed in the chassis 11. As shown in FIG. 8, the center bent piece 22f is engaged with one end of a torsion spring 23 which is mounted on the projected portion 11h projected from the bottom face of the chassis 11. By means of the biasing force of the torsion spring 23, the tab-like front portion 22a of the playback operation lever 22 is so designed to be constantly projected forwardly. A substantially rectangular hole 22h is formed at the center and at the right-hand side of the playback operation lever 22. A pair of drawing-pressed portions 22i, 22i and a pair of projected portions 22j, 22j, all constructing shaft portions, are integrally molded at the front of the lever 22 in such a manner as to extend in the direction perpendicular to the pair of slots 22c and 22d.

As shown in FIGS. 4 and 6, a substantially rectangular plate-like pinch-roller switching lever 24, made of metal, is supported on the playback operation lever 22 slidably in the left and right directions, for switching from one of the forward playback mode and the reverse playback mode to the other by means of the pair of drawing-pressed portions 22i, 22i and the pair of projected portions 22j, 22j. A head base 26 equipped with a recording and/or reproducing head 25, is firmly secured onto the pair of projected portions 22j, 22j by means of a pair of screws 27, 27. Integrally formed at the position offset rightwardly from the center of the front edge of the pinch-roller switching lever 24, is a tongue-like front portion 24a which is slidable together with the drawing-pressed portion 24b on the front portion 22a of the playback operation lever 22. Integrally formed at the position offset rightwardly from the center of the rear edge of the above-mentioned lever 24, is a C-shaped rear portion 24c which is inserted into the rectangular hole 22h of the playback operation lever 22 and thus slidable on the chassis 11. A torsion spring 28 is hanged between the drawing-pressed portion 22b of the front portion 22a of the playback operation lever 22 and the drawing-pressed portion 24b of the front portion 24a of the pinch-roller switching lever 24. By way of the biasing force of the torsion spring 28, after sliding in the lateral direction, the pinch-roller switching lever 24 is held at either one of the left and right positions. As seen in FIGS. 3 and 4, a pair of cassette positioning pins 29, 29, made of synthetic resin, are integrally molded between the pair of capstans 16 and 17 mounted on the chassis 11 by way of the outsert molding, for positioning the tape cassette 100 installed in the box-like cabinet 2.

As shown in FIG. 6, a pair of slots 24d, 24d and a pair of slots 24e, 24e are formed in both sides and in the middle of the pinch-roller switching lever 24, whereas a pair of substantially trapezoidal engaging holes 24f and 24g are formed at both ends of the pinch-roller switching lever in such a manner as to be tapered off to the outside. Additionally, a bent piece 24h is formed at the left-hand side end of the pinch-roller switching lever 24 by bending. The pair of slots 24d, 24d of the pinch-roller switching lever 24 are inserted into the pair of drawing-pressed portions 22i, 22i of the playback operation lever 22 and as a result the switching lever 24 is supported slidably in the lateral direction by a distance equal to the length of each slot 24d. The pinch-roller switching lever 24 is slidably supported on and engaged with the playback operation lever 22 by burring top ends of the respective drawing-pressed portions 22i such that the top ends are flanged outside.

As shown in FIGS. 4 and 6, a pair of left and right pinch rollers 30 and 31 are provided above the pair of engaging holes 24f and 24g of the pinch-roller switching lever 24 in a manner so as to abut with or to move away from the left and right capstans 16 and 17, in turns. The pair of pinch rollers 30 and 31 are rotatably supported by the shafts 33 in the respective semi-cylindrical top ends 32a of a pair of left and right roller support arms 32L and 32R. The respective datum end portions 32b of the pair of roller support arms 32L and 32R are pivotally supported on a pair of support shafts 34L and 34R which shafts are integrally projection-molded on both corners of the front side of the chassis 11 by way of outsert molding. To prevent the datum end portions from coming out, also provided are a pair of left and right nail portions 35L and 35R which are projection-molded integral with the respective support shafts 34L and 34R. Additionally, torsion springs 36L and 36R are wound on the respective datum end portions 32b of the pair of roller support arms 32L and 32R. Ends 36a, 36a of the torsion springs 36L and 36R are engaged with the respective top ends 32a, 32a, whereas the other ends 36b, 36b of the torsion springs 36L and 36R are inserted into and engaged with the respective engaging holes 24f and 24g of the pinch-roller switching lever 24.

Figure 18:
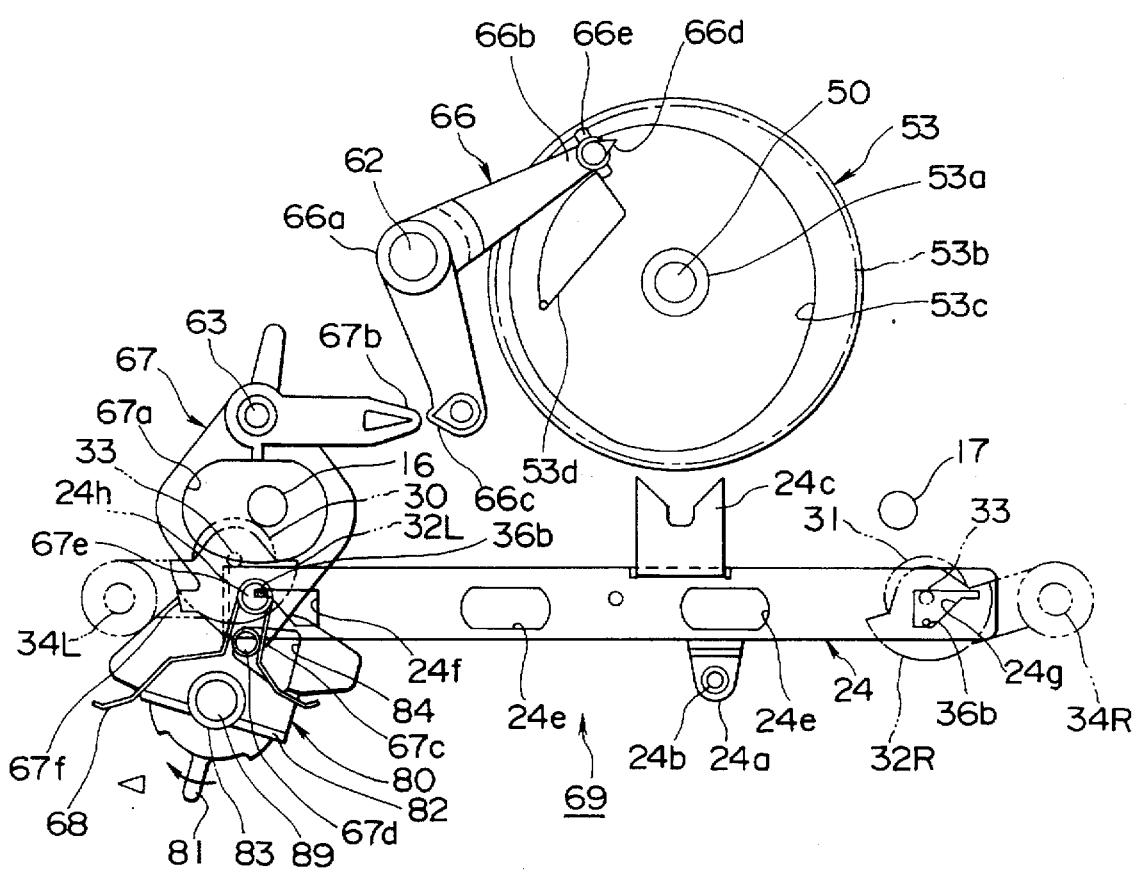
FIG. 18 is a schematic structural view illustrating an auto-direction mechanism of the mechanism of the tape recorder.
Figure 24:
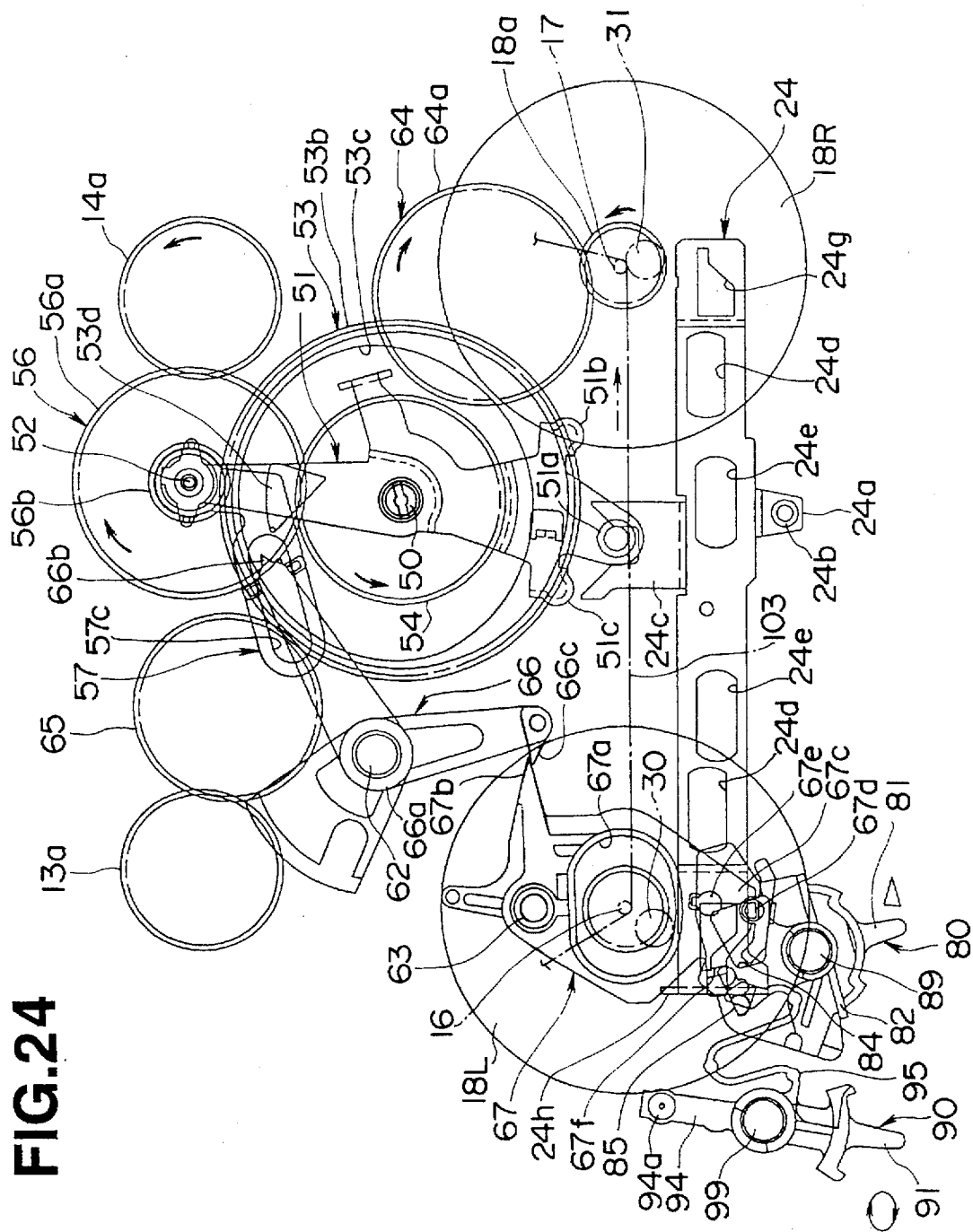
FIG. 24 is an explanatory view of the continuous repeated playback from face A to face B or vice versa.

As shown in FIG. 6, the bent piece 24h formed at the left-hand edge of the pinch-roller switching lever 24, is inserted into the middle of a pair of pins 85, 85 which are integrally formed on the upper face of a direction switching lever 80 as discussed later. Thus, when the direction switching lever 80 is pivoted rightwards, the pinch-roller switching lever 24 slides leftwards as seen in FIGS. 4 and 24 and thus the mode becomes shifted to the forward playback, with the result that the right-hand side pinch roller 31 is brought into abutment with the right-hand side capstan 17. In contrast, when the direction switching operation lever 80 is pivoted leftwards, the pinch-roller switching lever 24 slides rightwards as seen in FIG. 18 and thus the mode becomes shifted to the reverse playback, with the result that the left-hand side pinch roller 30 is brought into abutment with the left-hand side capstan 16.

Figure 9:
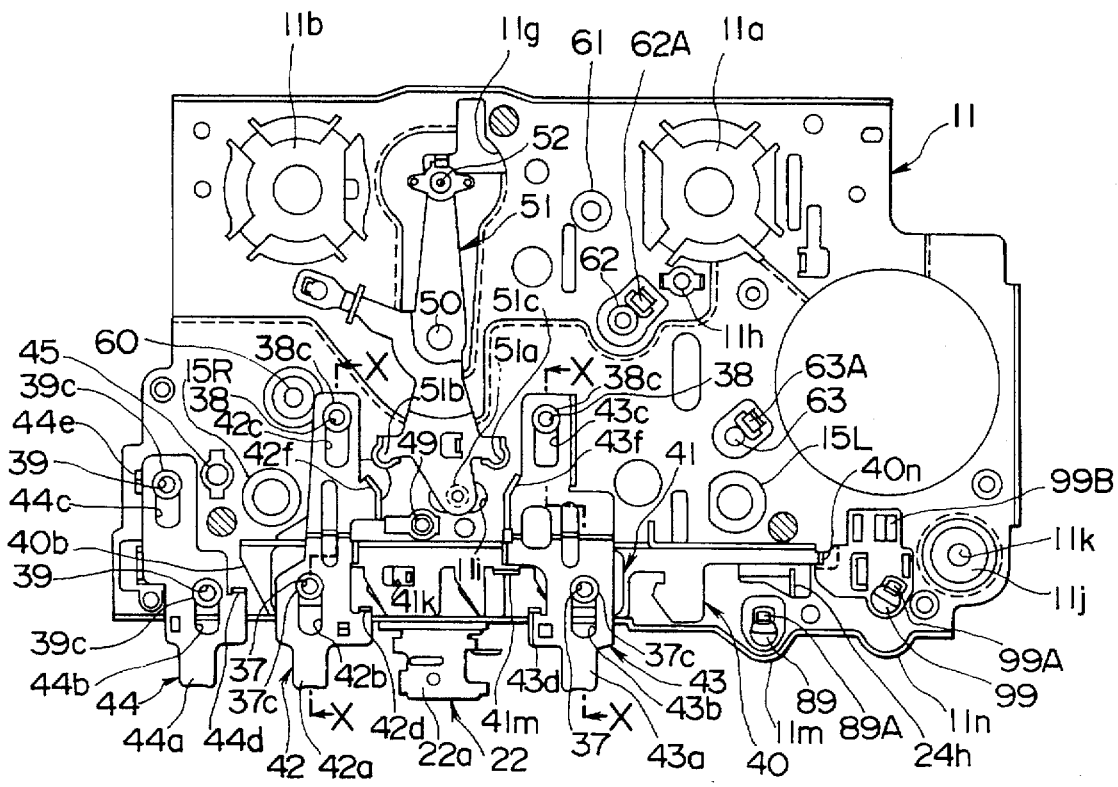
FIG. 9 is a plan view illustrating the essential portions the mechanism of the tape recorder from the reverse side.
Figure 10:
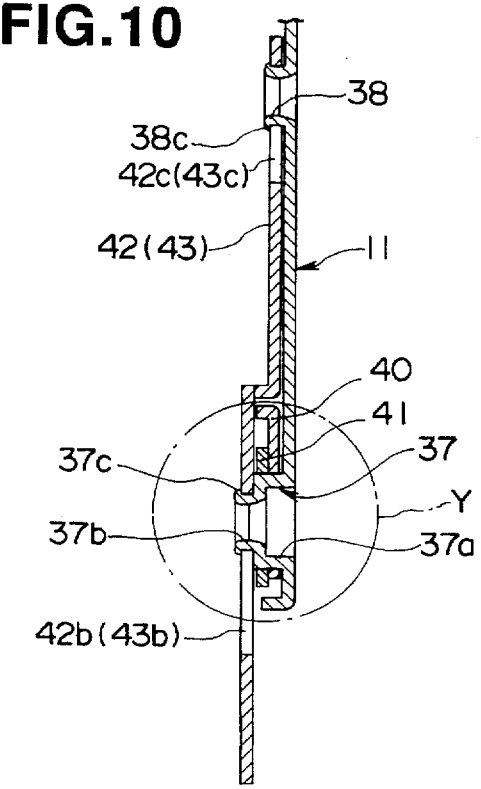
FIG. 10 is a cross-sectional view taken along the line X—X of FIG. 9.
Figure 11:
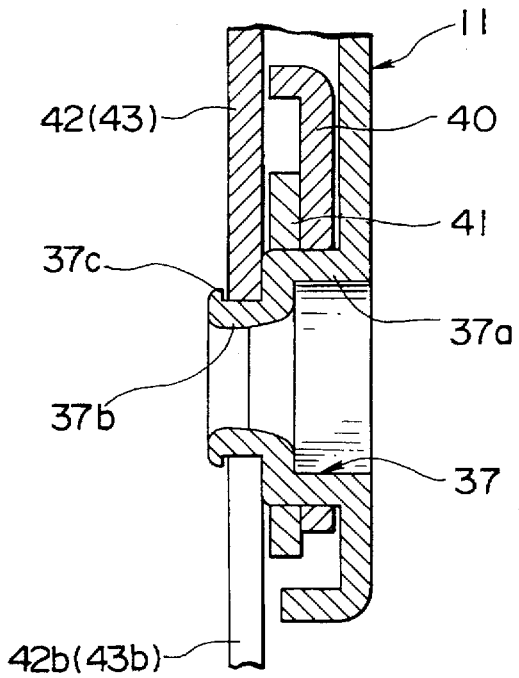
FIG. 11 is an enlarged cross-sectional view illustrating the zone indicated by Y in FIG. 10.

As shown in FIGS. 8 and 9, a pair of left and right two-stepped drawing-pressed portions 37, each constructing a shaft portion composed of a larger-diameter portion and a small-diameter portion, are integrally formed at the front end and on the lower face of the chassis 11 by way of pressing, for example. As shown in FIGS. 10 and 11, slidably stacked and installed onto the respective large-diameter portions 37a, 37a of the pair of drawing-pressed portions 37, 37, are a metal lock lever 40 and a metal switch lever 41, in such a manner that the levers are slidable in the lateral direction. Slidably provided onto the right-hand side small-diameter portion 37b of the pair of drawing-pressed portions 37, 37 and the right-hand side drawing-pressed portion 38 is a fast-forward running operation lever 42, whereas slidably provided onto the left-hand side small-diameter drawing-pressed portion 37b and the left-hand side small-diameter portion 38 is a metal rewind-operation lever 43. These metal operation levers are stacked with each other and installed slidably in the longitudinal direction.

As shown in FIGS. 8 and 89, a pair of front and rear one-stepped small-diameter drawing-pressed portions, each serving as a shaft portion, are integrally formed at the lower face and at the right-front corner of the chassis 11. A metal stop operation lever 44 is supported slidably in the longitudinal direction on the pair of small-diameter drawing-pressed portions 39, 39. Top ends of the respective drawing-pressed portions 37, 38 and 39 are formed by burring such that the top ends are flanged outside respectively to produce burred portions 37c, 38c and 39c. The slide levers 40, 41, 42, 43 and 44 are slidably engaged with each other by means of the burred portions 37c, 38c and 39c.

Figure 19:
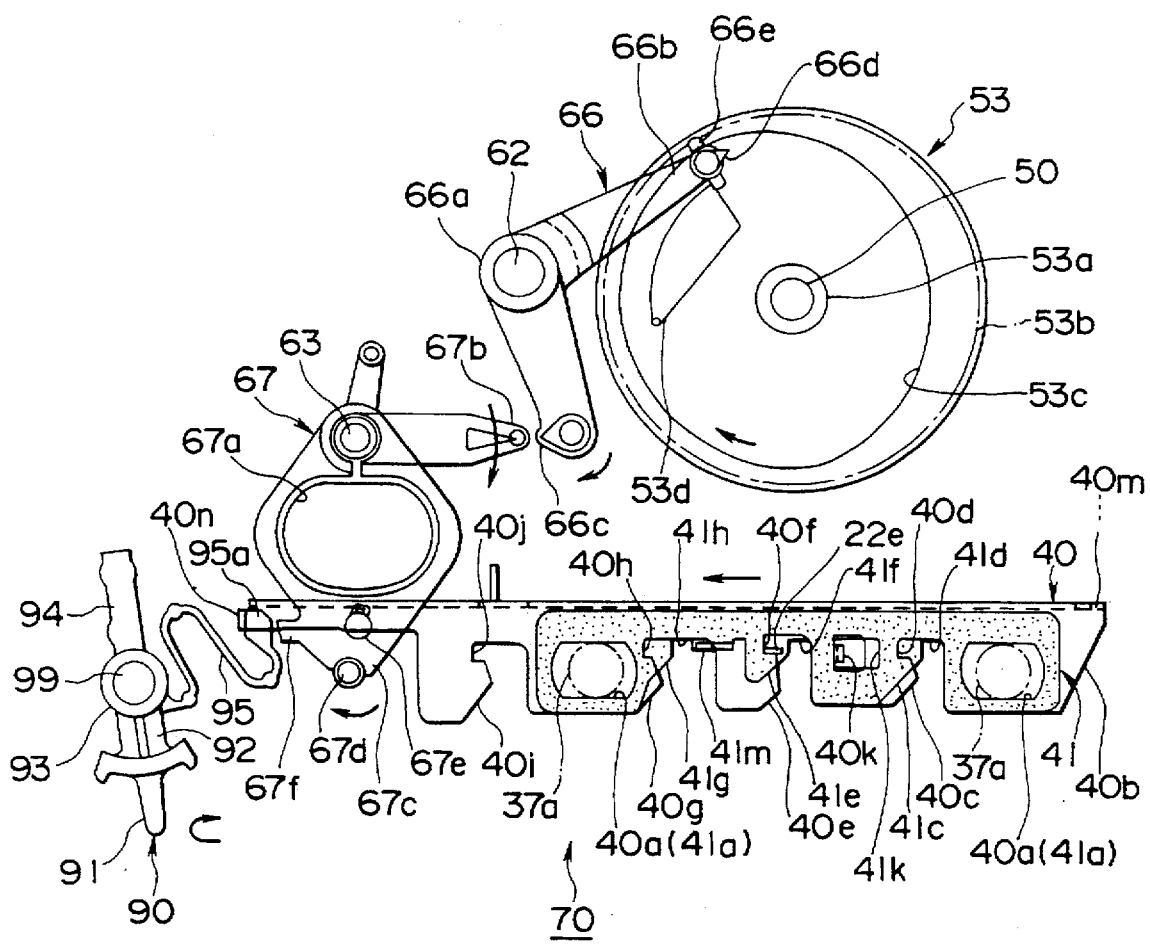
FIG. 19 is a schematic structural view illustrating an electric power hold mechanism of the mechanism of the tape recorder.
Figure 20:
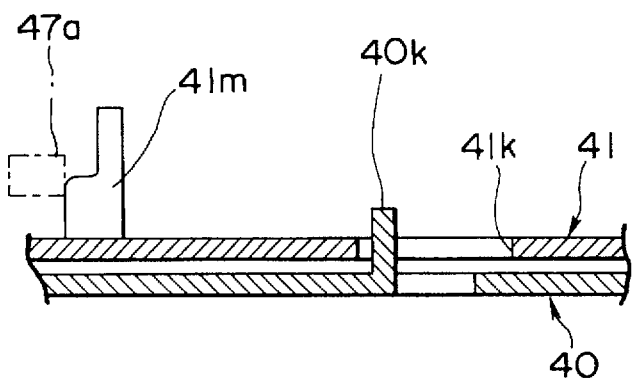
FIG. 20 is an enlarged cross-sectional view illustrating the linked relationship between a lock lever and a switch lever.

As shown in FIGS. 8, 9 and 19, the lock lever 40 is formed into a substantially rectangular plate whose front edge is uneven. The lock lever has a pair of slots 40a, 40a at its right-hand side and at the middle, respectively. The lock lever 40 is so designed to be slidable in the lateral direction by inserting the slots 40a into the respective large-diameter drawing-pressed portions 37a. As shown in FIG. 19, the lock lever 40 is formed with a tapered portion 40b (for use in stop operation) at the right end thereof. Also formed from the front-right end of the lock lever to the front-left end, are a tapered portion 40c and a hook-shaped portion 40d both used for the fast-forward running mode, a tapered portion 40e and a hook-shaped portion 40f both used for the forward playback running operation, a tapered portion 40g and a hook-shaped portion 40h both used for the rewind operation, and a tapered portion 40i and a hook-shaped portion 40j both used for the recording operation. A link nail 40k is formed between the above-noted hook-shaped portions 40c and 40e of the lock lever 40, by bending the link nail downwardly. As shown in FIG. 8, formed at the rightmost end of the lock lever 40 by downward bending is a reversed L-shaped bent piece 40m and formed at the leftmost end of the lock lever by downward bending is a rectangular bent piece (one endmost portion) 40n. Hanged on the right-hand side bent piece 40m is one hooked end 45a of a torsion spring 45. The torsion spring 45 is wound on a shaft portion 46, made of synthetic resin, which is integrally formed on the lower face of the chassis 11 by way of the outsert molding, so that the lock lever 40 is constantly biased toward the stop operation lever 44 by means of tension of the torsion spring 45.

As clearly seen in FIGS. 8, 9 and 19, the switch lever 41 is formed into a substantially rectangular shape of a shorter length than the lock lever 40, and formed with a pair of slots 41a, 41a at both sides thereof. The switch lever 41 is so designed to be slidable in the lateral direction by inserting the slots 41a into the respective large-diameter drawing-pressed portions 37a of the chassis 10. As seen in FIGS. 19, formed at the front edge and at the middle of the switch lever 41 are a tapered portion 41c and a concavity 41d both used for the fast-forward running operation, a tapered portion 41e and a concavity 41f both used for the forward playback operation, and a tapered portion 41g and a concavity 41h both used for the rewinding operation. Also formed at the position opposing to the link nail 40k of the switch lever 41 is a rectangular hole 41k. Integrally formed downwardly at the concavity 41h for use in the rewinding operation is a bent piece 41m which is provided for switching a power switch 47 ON or OFF by engagement with or disengagement from the operation portion 47a of the power switch 47. The power switch 47 is designed in a manner so as to be switched ON while the operation portion 47a, spring-loaded by means of a return spring (not shown), is pressed by the bent piece 41m and thus the operation portion 47a is held at its backward position, and to be switched OFF while the bent piece 41m moves away from the operation portion 47a and thus the operation portion 47a is returned to its initial position by means of the bias of the return spring. By means of the biasing force of the return spring of the operation portion 47, the switch lever 41 is returned to its initial position.

The power switch 47 is so designed to be switched ON by the bent piece 41m in case that the switch lever 41 slides leftward (toward the rewind operation lever 43) by virtue of the link nail 40k of the lock lever 40, when the bent piece 22e of the playback operation lever 22 is brought into engagement with the tapered portion 40e and the hook-shaped portion 40f of the lock lever 40 and with the tapered portion 41e and the concavity 41f of the switch lever 41, while pushing the playback operation lever 22 against the bias of the torsion spring 23. The switched-ON state is held as long as the bent piece 22e of the playback operation lever 22 is locked by the hook-shaped portion 40f of the lock lever 40, and held until the locked state of the playback operation lever 22 is released by means of the stop operation lever 44 as set out below. In the same manner as the pressing action of the playback operation lever 22, in case of the respective pressing action of the fast-forward running operation lever 42 and the rewind operation lever 43, the power switch 47 is switched ON by way of the leftward sliding motion of the lock lever 40 and the switch lever 41, and switched OFF by way of the motion of the stop operation lever 44.

As indicated in FIGS. 8 and 9, the fast-forward running operation lever 42 is equipped with the fast-forward running button 5 installed on its front end portion 42a, and formed with a pair of slots 42b and 42c in front of and in the rear of the central stepped portion of the lever. The fast-forward running operation lever 42 is slidable in the longitudinal direction by inserting the front-side slot 42b into the right-hand side small-diameter drawing-pressed portion 37b of the chassis 11 and by inserting the rear-side slot 42c into the left-hand side small-diameter drawing-pressed portion 38 of the chassis 11. Also formed at the left edge of the fast-forward running operation lever 42 by bending are an upwardly-extending rectangular bent piece 42d located at the front side, a downwardly-extending C-shaped bet piece 42e located in the center, and a downwardly-extending doglegged bent piece 42f located in the rear side. The front bent piece 42d of the fast-forward running operation lever 42 is associated with the hook-shaped portion 40d of the lock lever 40 in a manner so as to be engageable with and to be dis-engageable from the hook-shaped portion. One end 48a of the torsion spring 48 is engaged with and hanged on the center bent piece 42e. The torsion spring 48 is wound on a shaft portion 49, made of synthetic resin, which is integrally molded on the lower face of the chassis 11, by way of the outsert molding, such that the torsion spring constantly biases the fast-forward running operation lever 42 in the forward direction.

As shown in FIGS. 8 and 9, the rewind operation lever 43 is equipped with the rewind button 6 installed on the its front end portion 43a, and formed with a pair of slots 43b and 43c in front of and in rear of the central stepped portion of the lever. The rewind operation lever 43 is slidable in the longitudinal direction by inserting the front-side slot 43b into the center small-diameter drawing-pressed portion 37b of the chassis 11 and by inserting the rear-side slot 43c into the center small-diameter drawing-pressed portion 38. Also formed at the right edge of the rewind operation lever 43 by bending are an upwardly-extending rectangular bent piece 43d located in the front side, a downwardly-extending C-shaped bent piece 43e located in the center, and a downwardly-extending doglegged bent piece 43f located in the rear side. The front bent piece 43d of the rewind operation lever 43 is associated with the hook-shaped portion 40d of the lock lever 40 in a manner so as to be engageable with and to be disengageable from the hook-shaped portion. The other end 48b of the torsion spring 48 is engaged with and hanged on the center bent piece 43e. By means of the bias of the torsion spring 48, the rewind operation lever 43 is constantly biased in the forward direction.

As shown in FIGS. 8 and 9, the stop operation lever 44 is equipped with the stop button 7 installed on the front end portion 44a, and formed with a pair of slots 44b and 44c in front and the rear of the lever. The stop operation lever 44 is slidable in the longitudinal direction by inserting the pair of slots 44b and 44c into the pair of small-diameter drawing-pressed portions 39, 39, respectively. The stop operation lever 44 is formed with an upwardly-extending rectangular bent piece 44d at its left edge and at the front side, and a downwardly-extending C-shaped bent piece 44e at the right edge and at the rear side, by bending. The front bent piece 44d of the stop operation lever 44 is associated with the right-hand side tapered portion 40b of the lock lever 40 in a manner so as to be engageable with and dis-engageable from the right-hand side tapered portion. The other end 45b of the torsion spring 45 is engaged with and hanged on the rear bent piece 44e. By means of the bias of the torsion spring 45, the stop operation lever 44 is constantly biased in the forward direction.

As shown in FIGS. 5, 8 and 9, supported on the lower face of the chassis 11 pivotably in the lateral direction and at the rear side of the intermediate space between the fast-forward running operation lever 42 and the rewind operation lever 43 is a substantially T-shaped metal FR switching lever 51 which is provided for switching one of the forward playback running (FWD) mode, the reverse playback running (RVS) mode, the fast-forward running (FF) mode, and the rewinding (REW) mode to the other by means of a metal bar-like support shaft 50. Integrally formed on the upper face and in the center portion of the front edge of the FR switching lever 51 is an upwardly-extending drawing-pressed portion 51a which projects into a slot 11i of the chassis 11. Also integrally formed on the lower face and in the front-left and front-right ends of the FR switching lever is a pair of downwardly-extending arc-shaped bent pieces 51b and 51c. A downwardly-projecting metal bar-like support shaft 52 is provided on the lower face and in the rear side of the FR switching lever 51.

Figure 22:
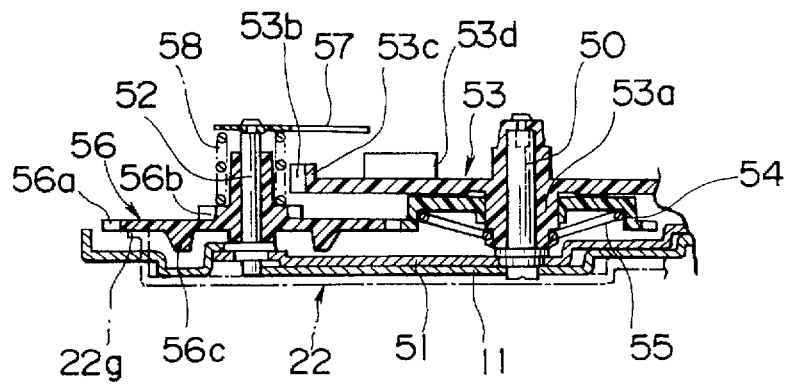
FIG. 22 is a cross-sectional view explaining the relation between the oscillating gear and the cam gear when switching from the forward playback running (FWD) mode to the reverse-rotation playback running (RVS) mode.

As shown in FIGS. 7, 22 and 32, a cylindrical portion 53a of a large-diameter cam gear 53, made of synthetic resin, is rotatably supported on the support shaft 50 which is projected downward of the chassis 11 and pivotally supports the FR switching lever 51. The cam gear 53 is formed integral with a gear 53b on its outer periphery, and with a concave elliptical and eccentric cam portion 53c at its lower face. A substantially triangular-prism shaped convex cam portion 53d is integrally formed at the thinned section of the cam portion 53c formed on the lower face of the cam gear 53. A small-diameter driven gear 54, made of synthetic resin, is rotatably supported on the cylindrical portion 53a of the cam lever 53 and in the side of the lever 51, by means of a clutch mechanism 55 including a spring and so forth.

Figure 25:
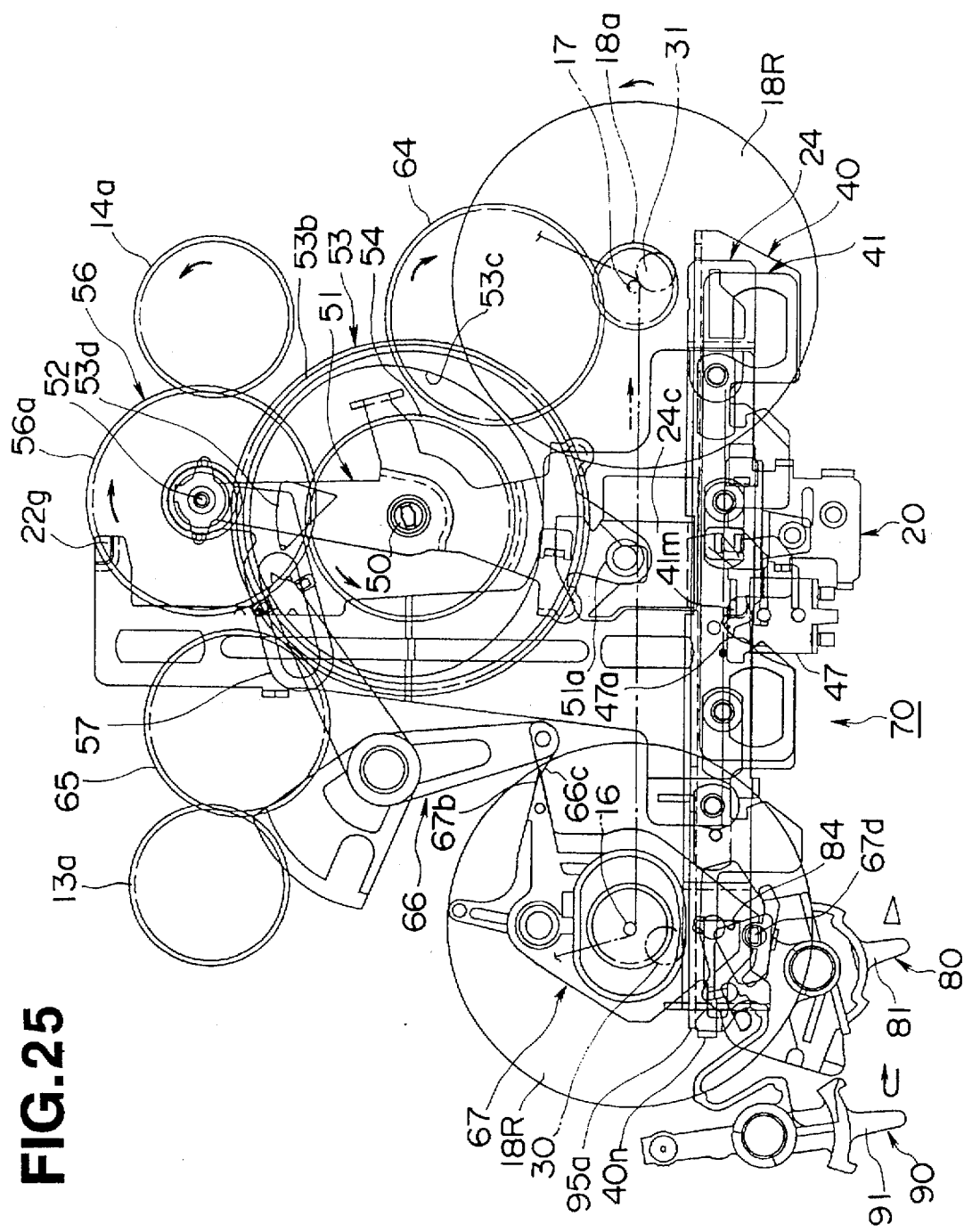
FIG. 25 is an explanatory view of the playback operation in case of switching to the stop mode after the continuous playback from the face A to face B and from face B to face A.
Figure 26:
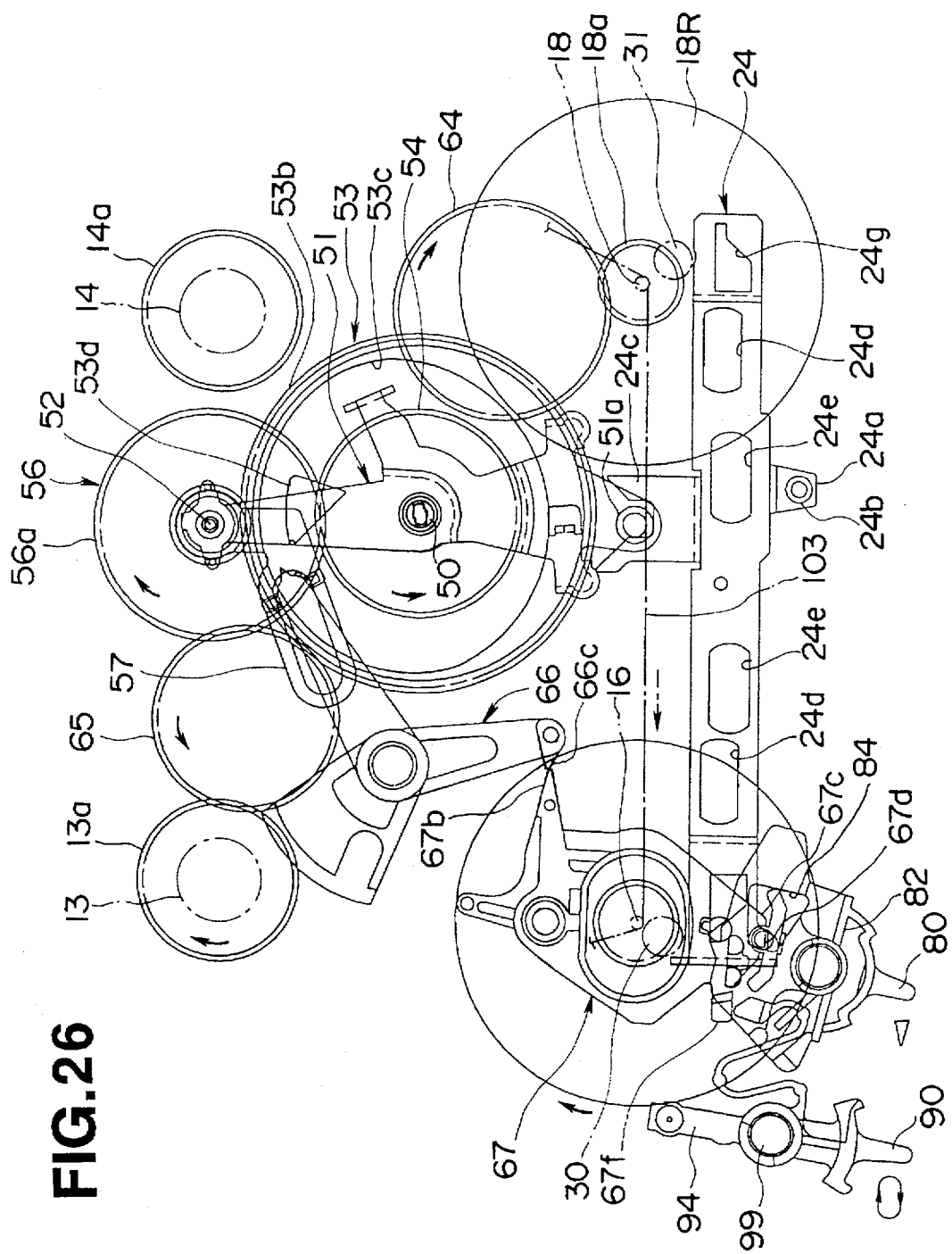
FIG. 26 is an illustration of such a particular state that the magnetic tape is driven in the reverse-rotation running direction in the playback operation in which the continuous repeated playback is executed from face A to face B or from face B to face A.

As shown in FIGS. 4 and 6, the drawing-pressed portion 51a of the FR switching lever 51 is maintained at the position opposing the C-shaped rear portion 24c of the pinch-roller switching lever 24 in the stop state wherein the pinch-roller switching lever is not pressed by the playback operation lever 22. In the case of the playback state wherein the pinch-roller switching lever 24 is pressed by the playback operation lever 22 and shifted toward the pair of capstans 16 and 17, the drawing-pressed portion 51a is so designed to be engaged with the rear portion 24c. During the above-noted engagement, as seen in FIG. 25, when the pinch-roller switching lever 24 is moved leftward by shifting the direction switching operation lever 80 rightward, the support shaft 52 of the FR switching lever 51 moves toward the gear 14a of the take-up reel base 14. In the same manner, as seen in FIG. 26, thereafter, when the pinch-roller switching lever 24 is shifted rightward by shifting the direction switching operation lever 80 in the leftward direction, the support shaft 52 of the FR switching lever 51 moves toward the gear 13a of the supply reel base 13.

Figure 34:
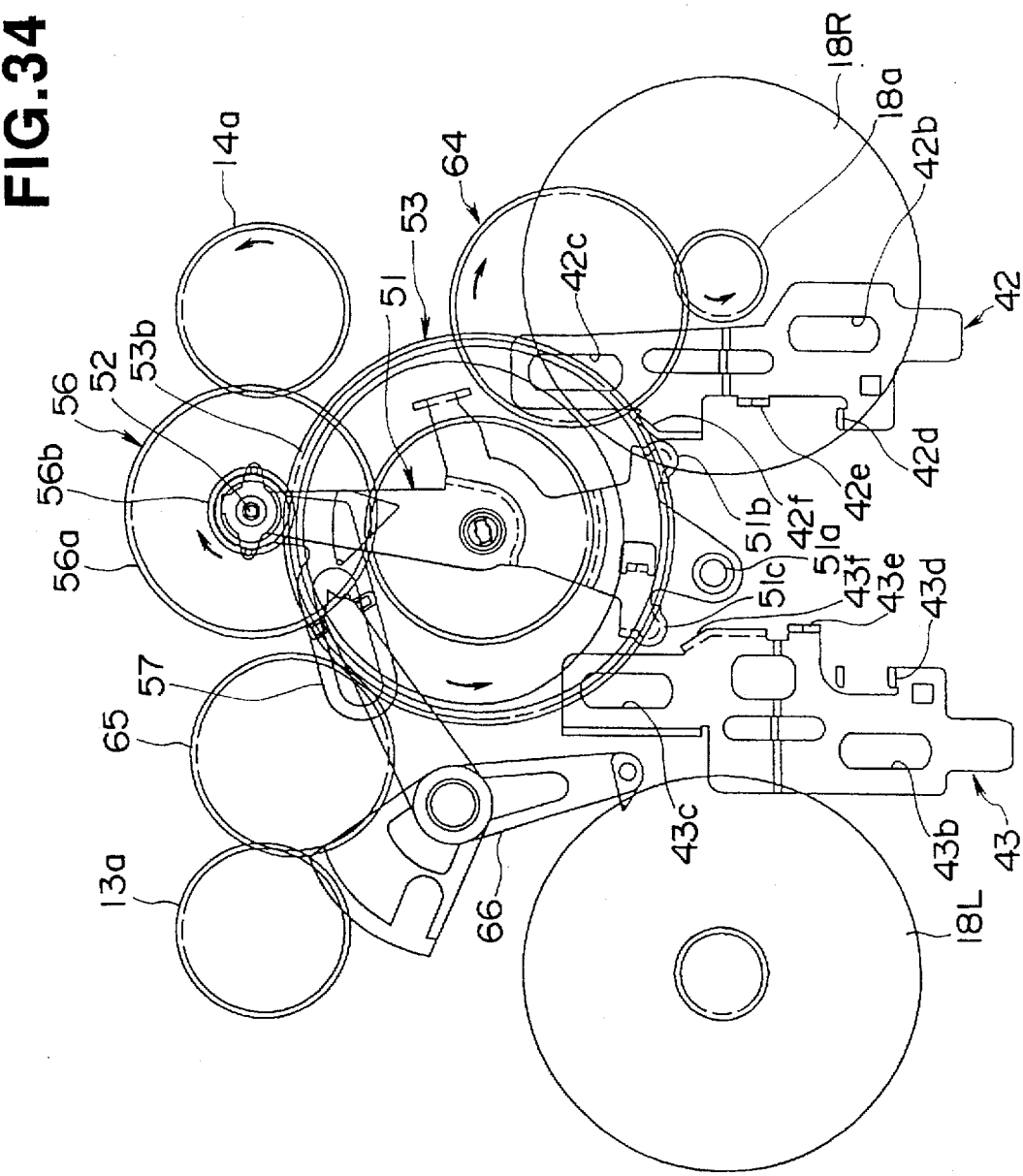
FIG. 34 is a schematic structural view illustrating the relation among the oscillating gear and the cam gear during the fast-forward running, and the respective operation levers for the fast-forward running operation and for the rewinding operation.
Figure 35:
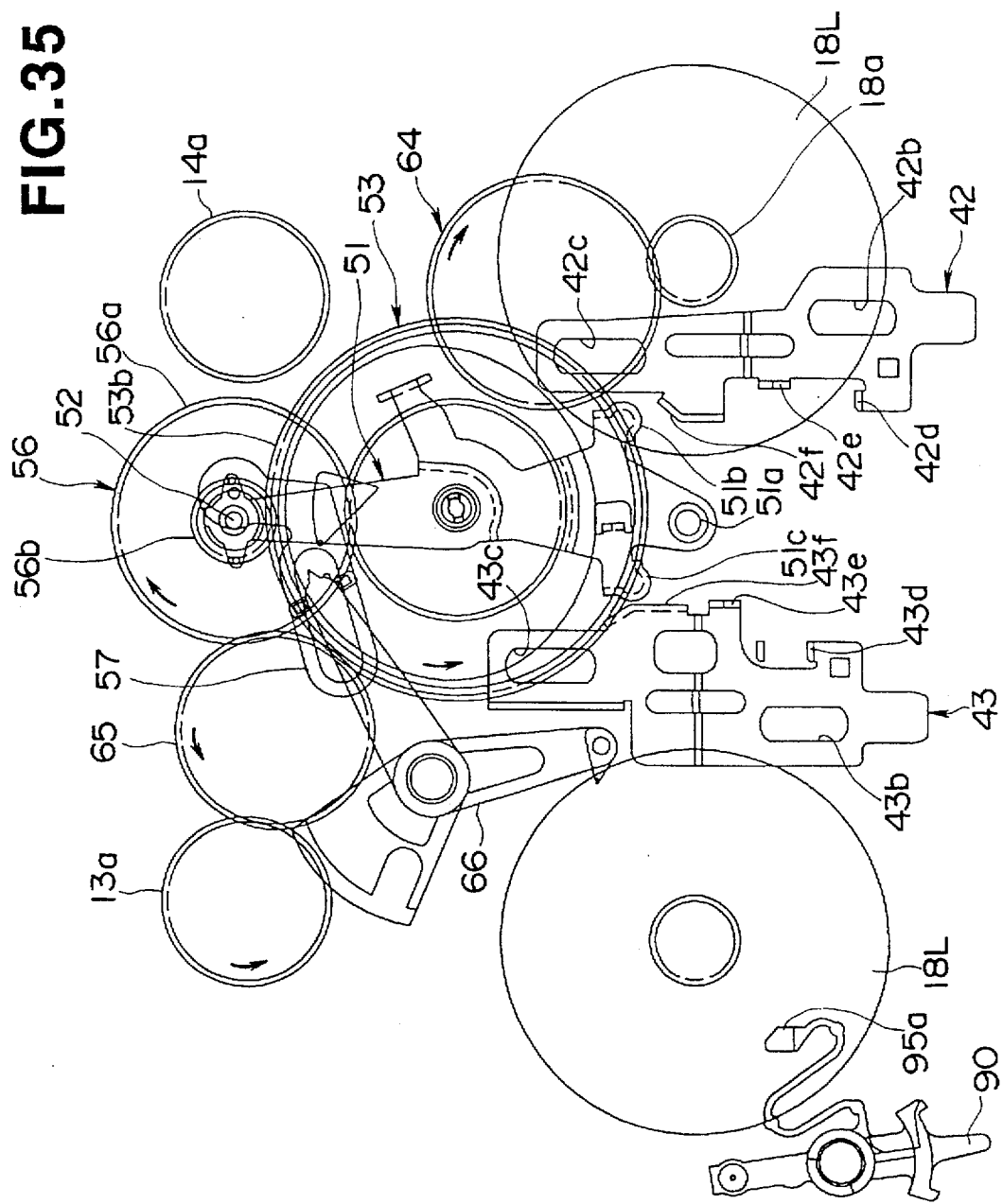
FIG. 35 is the schematic structural view shown in FIG. 34 illustrating in addition to a mode switching operation lever.

As shown in FIG. 34, the right bent piece 51b of the FR switching lever 51 is associated with the bent piece 42f of the fast-forward running operation lever 42 in a manner so as to be engageable with and dis-engageable from the bent piece, and when the bent piece 51b and the bent piece 42f abut with each other, the support shaft 52 of the FR switching lever 51 moves toward the gear 14a of the take-up reel base 14. As shown in FIG. 35, the left bent piece 51c of the FR switching lever 51 is associated with the bent piece 43f of the rewind operation lever 43 in a manner so as to be engageable with and dis-engageable from the bent piece, and when the bent piece 51c and the bent piece 43f abut with each other, the support shaft 52 of the FR switching lever 51 moves toward the gear 13a of the supply reel base 13.

Figure 13:
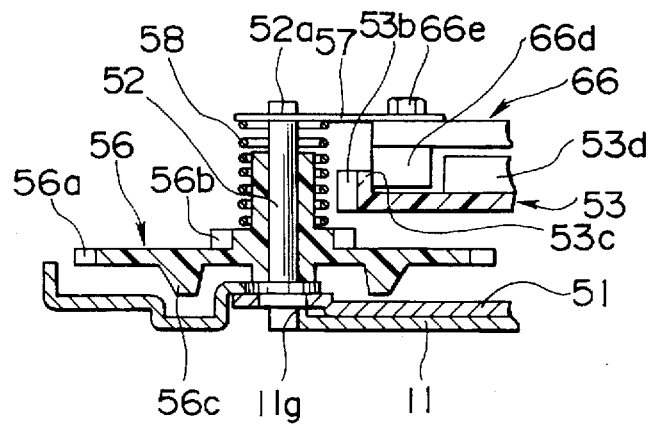
FIG. 13 is a cross-sectional view illustrating the construction of a particular portion corresponding to an oscillating gear incorporated in the mechanism of the tape recorder.

As shown in FIGS. 7 and 13, an oscillating gear 56, made of synthetic resin, is supported rotatably and slidably in the vertical direction on the support shaft 52 of the FR switching lever 51. The oscillating gear 56 has an upper large-diameter gear 56a and a lower small-diameter gear 56b formed integral with the gear 56a. Also, detachably mounted on the engaged portion 52a of the support shaft 52 is a hole 57a having a slit 57b formed at one end of a substantially doglegged friction lever 57 which is formed of polyethylene terephthalate (PET) into a thinned plate shape. A metal coil spring 58 is disposed between the small-diameter gear 56b of the oscillating gear 56 and the perimeter of the hole 57a of the friction lever 57.

Figure 14:
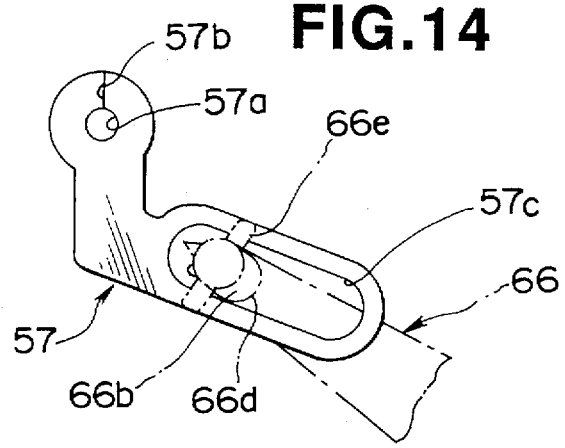
FIG. 14 is a plan view illustrating a friction lever.
Figure 15:
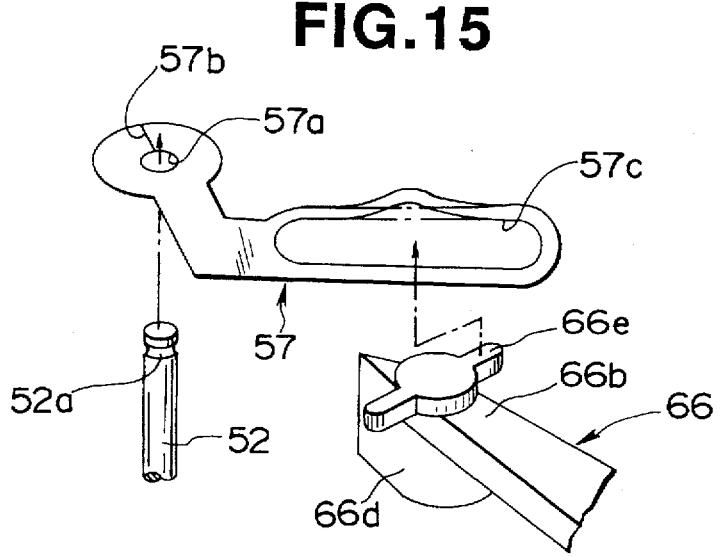
FIG. 15 is an exploded perspective view explaining procedures of installation of the friction gear.

During the stop mode, during the fast-forward running mode, and during the rewinding mode, as seen in FIG. 32, the oscillating gear 56 is held at its lower position (the upper position in FIG. 32) by abutment of the projected portion 56c of the upper face of the oscillating gear 56 with the bent piece 22g of the playback operation lever 22 which bent piece is formed on the rear end (top end) of the playback operation lever 22 projected below the lower face of the chassis 11. Under this condition, the small-diameter gear 56b of the oscillating gear 56 comes in meshed-contact with the gear 53b of the cam gear 53. As shown in FIG. 22, during the forward playback operation and during the reverse playback operation, the projected portion 56c of the oscillating gear 56 moves away from the bent piece 22g of the playback operation lever 22 and thus the oscillating gear 56 is held in its upper position (the lower position in FIG. 22). At this time, the large-diameter gear 56a of the oscillating gear 56 comes in meshed-contact with the driven gear 54 rotating together with the cam gear 53. By means of the elastic biasing force of the coil spring 58 and the frictional force of the oscillating gear 56, the rotational force of the oscillating gear 56 is transmitted to the friction lever 57 which is supported on the support shaft 52. As seen in FIGS. 14 and 15, the friction lever 57 is formed with a wide slot 57c at the other end thereof, such that the wide slot is engageable with the hook-shaped portion 66e of the first detection lever 66, as set out later.

As shown in FIGS. 8 and 9, by way of the outsert molding, integrally molded at the right-hand side of the lower face of the chassis 11 and above the center off to the left are a support shaft 60, a support shaft 61, a support shaft 62 with a nail portion 62A, and a support shaft 63 with a nail portion 63A, all shafts being made of synthetic resin and projected downward. As shown in FIGS. 5, 7 and 23, rotatably supported on the support shaft 60 is a first intermediate gear 64 made of synthetic resin and composed of an upper large-diameter gear 64a and a lower small-diameter gear 64b formed integrally with each other, and also rotatably supported on the support shaft 61 is a second intermediate gear 65 which is made of synthetic resin and engageable with the gear 13a of the supply reel base 13. The first detection lever 66, made of synthetic resin, is pivotably supported on the support shaft 62, whereas the second detection lever 67, made of synthetic resin, is pivotably supported on the support shaft 63.

As shown in FIGS. 5 and 23, the large-diameter gear 64a of the first intermediate gear 64 is in meshed-contact with the gear 18a of the right-hand side driven pulley 18R, while the small-diameter gear 64b of the intermediate gear 64 is in meshed-contact with the gear 53b of the cam gear 53. As seen in FIGS. 5, 7 and 18, the first detection lever 66 is composed of a central portion 66a through which the lever is pivotably supported on the support shaft 62, a top end portion 66b, and a substantially triangular-prism shaped datum end portion 66c, and formed into a doglegged shape. As shown in FIGS. 7 and 15, integrally formed at the upper endmost portion of the top end 66b of the detection lever 66 are a substantially triangular-prism shaped cam follower 66d which is slidable on the concave elliptical cam portion 53c and on the convex cam portion 53d, and a hook-shaped portion 66e which is detachably engaged with the slot 57c of the friction lever 57 and which is located below the endmost portion in such a manner as to project to both sides of the top end.

As shown in FIGS. 5 and 18, the second detection lever 67 has a slot 67a in the middle thereof, and is composed of a right-hand side substantially triangular-prism shaped top end 67b and a datum end portion 67c and formed into a substantially L shape. Integrally formed on the lower face of the datum end portion 67c of the detection lever 67 are a cylindrical second upright portion 67e to which a long-armed torsion spring 68 is hanged and a reversed L-shaped third upright portion 67f in the left-hand side of the second upright portion.

Figure 28:
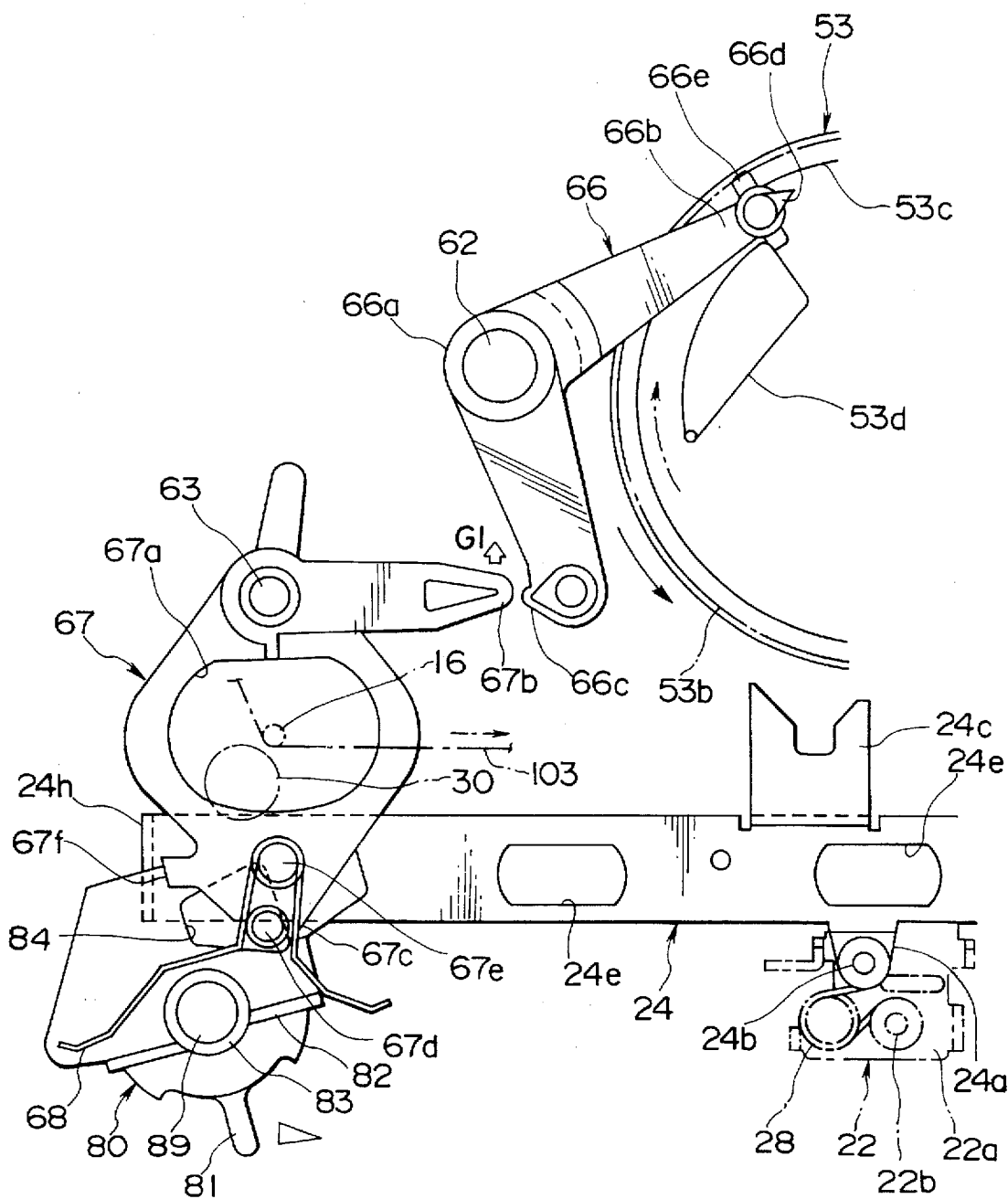
FIG. 28 is an enlarged view illustrating the state of the essential portions in the forward running playback mode of the mechanism of the tape recorder.
Figure 29:
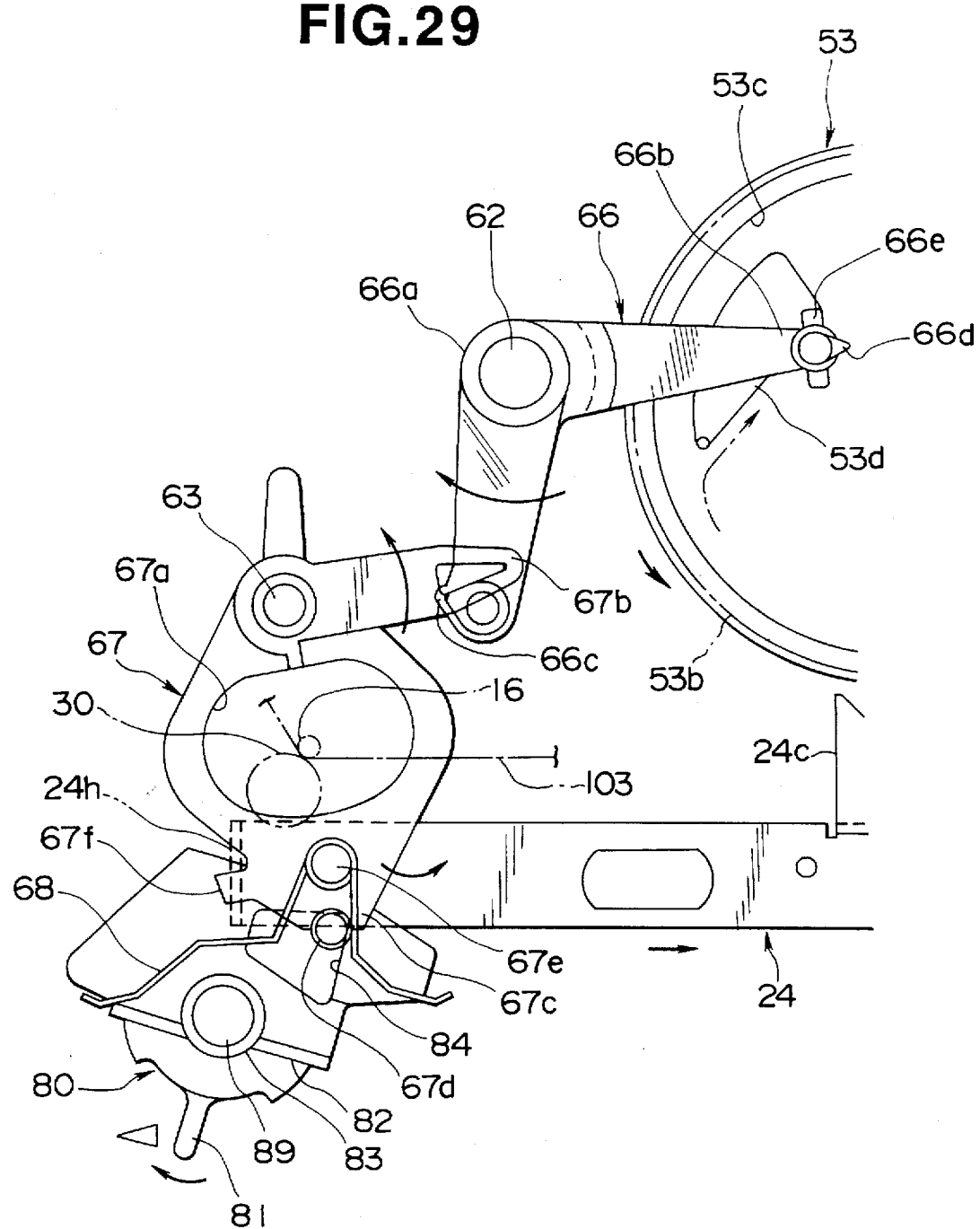
FIG. 29 is an enlarged view illustrating the state of the essential portions at the moment when the running direction of the tape is switched from the forward running (FWD) direction to the reverse-rotation running (RVS) direction
Figure 30:
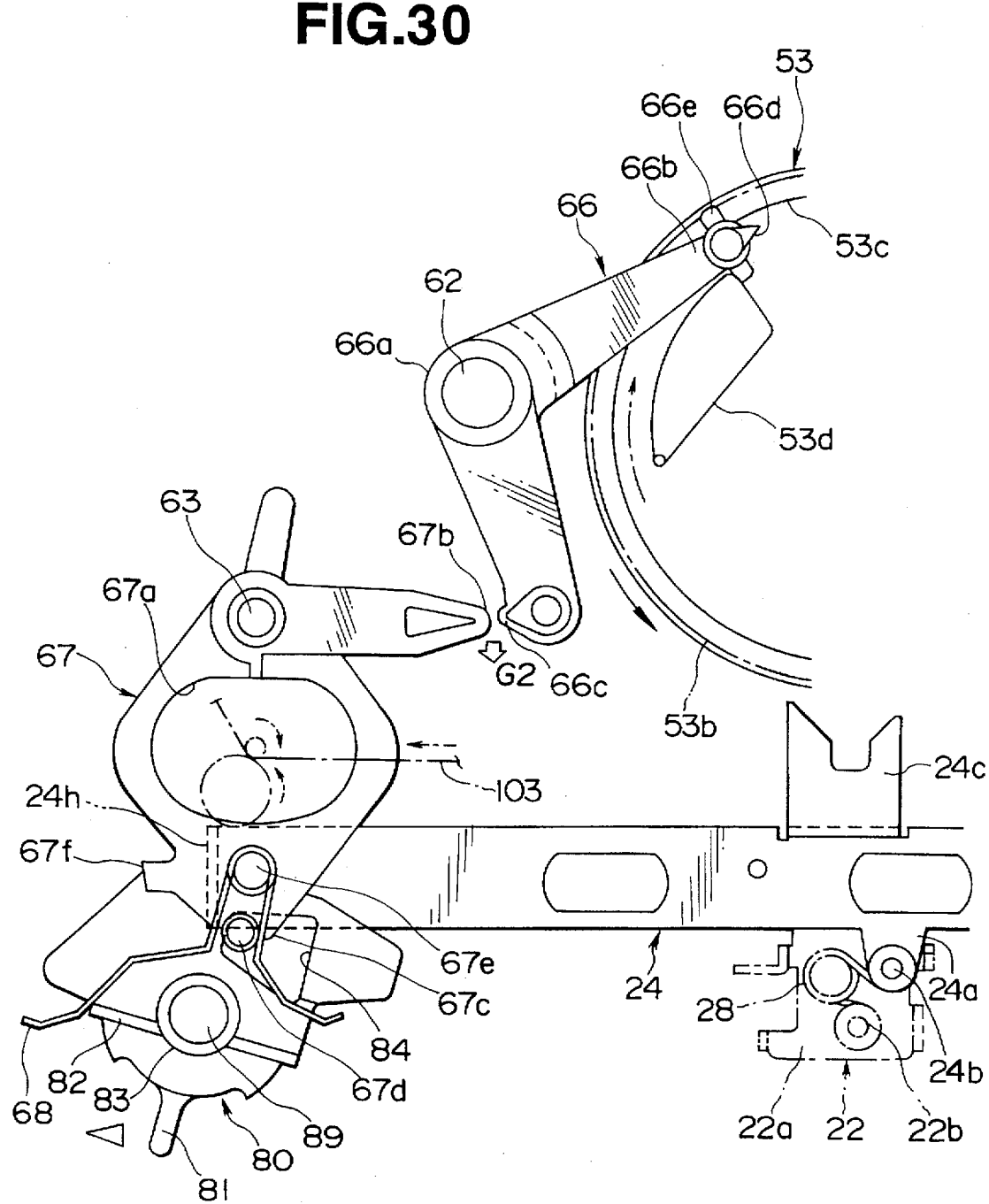
FIG. 30 is an enlarged view illustrating the state of the essential portions in the reverse-rotation playback running (RVS) mode
Figure 31:
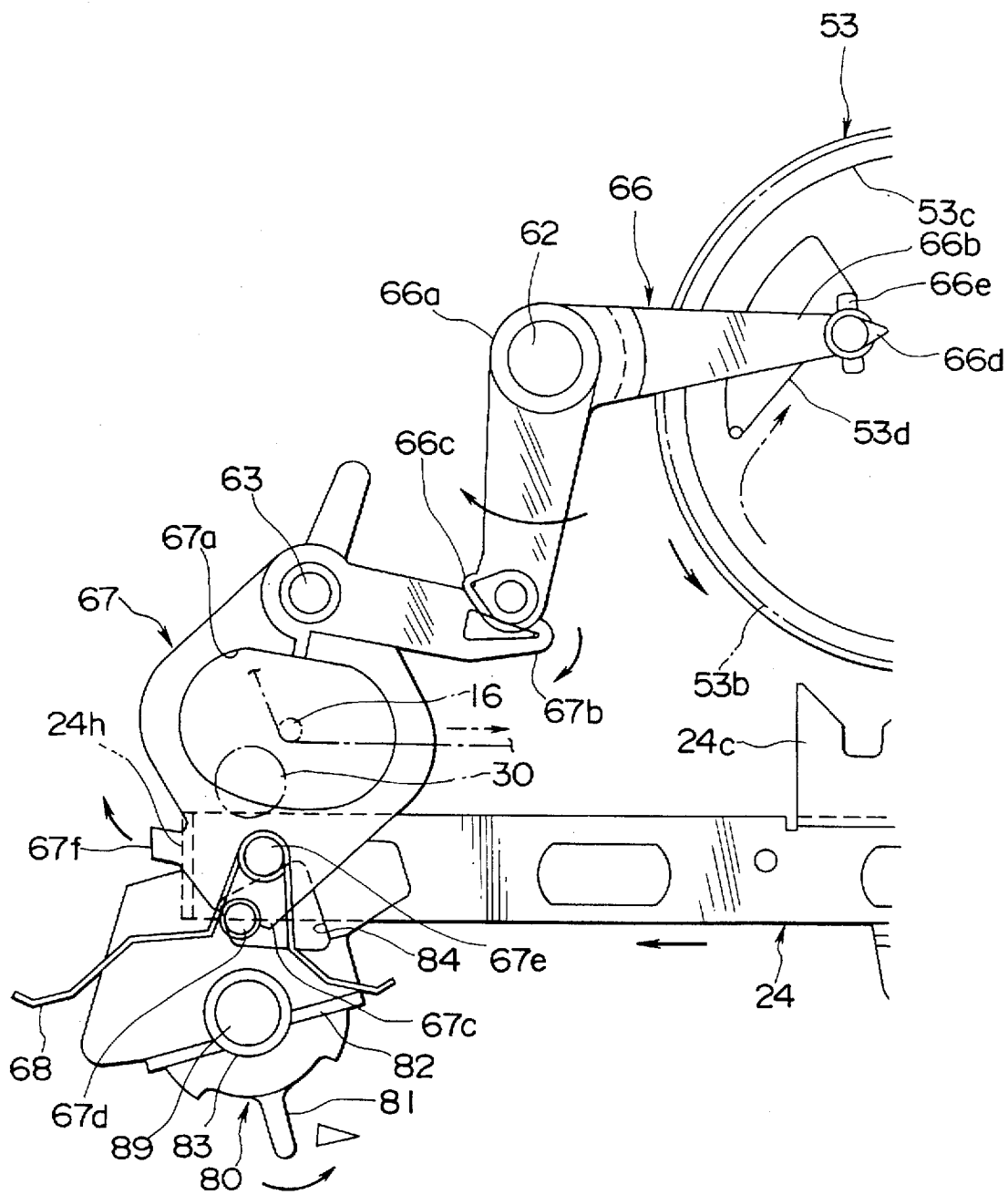
FIG. 31 is an enlarged view illustrating the state of the essential portions at the moment when the running direction of the tape is switched from the reverse-rotation running (RVS) direction to the forward running (FWD) direction

As shown in FIGS. 24 and 28, during the double-face forward playback mode (FWD) of the magnetic tape 103, the datum end portion 66c of the first detection lever 66 is positioned away from and below the top end 67b of the second detection lever 67. As shown in FIG. 29, when the running direction of the magnetic tape 103 is switched from the forward playback running direction to the reverse playback running direction, the datum end portion 66c of the first detection lever 66 is pressed upward from the lower side of the top end 67d of the second detection lever, and as a result the datum end portion 67c of the second detection lever 67 is moved rightward. As shown in FIGS. 26 and 30, during the double-face reverse playback mode (RVS) of the magnetic tape 103, the datum end portion 66c of the first detection lever 66 is positioned away from and above the top end 67b of the second detection lever 67. As shown in FIG. 31, when the running direction of the magnetic tape 103 is switched from the reverse playback running direction to the forward playback running direction, the datum end portion 66c of the first detection lever 66 is pressed downward from the upper side of the top end 67b of the second detection lever 67 and as a result the datum end portion 67c of the second detection lever 67 is moved leftward.

Figure 12:
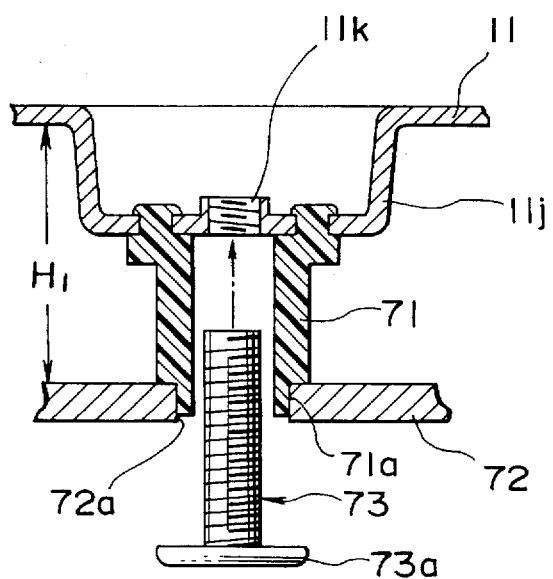
FIG. 12 is a partial cross-sectional view illustrating the construction of a particular portion at which a printed wiring board is installed on the chassis.

As shown in FIGS. 8 and 12, a concave downwardly-projected portion 11j is deep-drawing-pressed on the lower face and at the front-left corner of the chassis 11 by pressing to such a degree that the depth of the projected portion is reached up to a limit of plastic working region. A female-screw threaded portion 11k is formed in the center of the projected portion 11j by tapping or the like. A cylindrical portion 71, made of synthetic resin, is integrally molded around the female-screw threaded portion 11k by way of the outsert molding in such a manner as to extend downward. Fitted onto the outer periphery 71a of the lower end of the cylindrical portion 71 is a hole 72a of a printed wiring board 72. The printed wiring board 72 is secured onto the chassis 11 by means of screw-threaded engagement of an earth screw 73 with the screw-threaded portion 11k. With the head 73a of the earth screw 73 and the earth pattern 72b of the printed wiring board 72 in contact, the earth pattern 72b of the printed wiring board 72 is conducted with the chassis 11 through the earth screw 73.

As shown in FIGS. 6 through 9, and 16, the chassis 11 is formed with a pair of bent portions 11m and 11n at the front-left end, which bent portions are arc-shaped from the plan view and bent into a L shape. By way of the outsert molding, integrally molded at the positions opposing the respective bent portions 11m and 11n of the chassis 11 are a support shaft 89 having a nail portion 89A and a support shaft 99 having a nail portion 99A, both support shafts are made of synthetic resin and extend downward. The direction switching operation lever 80 is pivotably supported on the one support shaft 89, whereas the mode switching operation lever 90 is pivotably supported on the other support shaft 99. An operation portion 81 is integrally formed at he front side of the direction switching operation lever 80. Integrally formed at the rear side of the operation portion 81 is an upright portion 82 with which either one of both arms of the torsion spring 68 engaged with the second detection lever 67 is engaged in turns. Also formed in the center of the upright portion 82 of the direction switching operation lever 80 is a cylindrical portion 83 into which a support shaft 89 is inserted. Formed at the rear-right side of the cylindrical portion 83, is a trapezoidal slot 84 with which the first upright portion 67d of the second detection lever 67 is engaged. As seen in FIG. 6, integrally formed in the rear-left side and on the upper face of the direction switching operation lever 80 are the pair of pins 85, 85 which expose to the upper face of the chassis 11 through a slot 11p of the chassis 11. The bent piece 24h, which is formed at the leftmost end of the pinch-roller switching lever 24, is engaged into the intermediate space between the pair of pins 85, 85.

Figure 16:
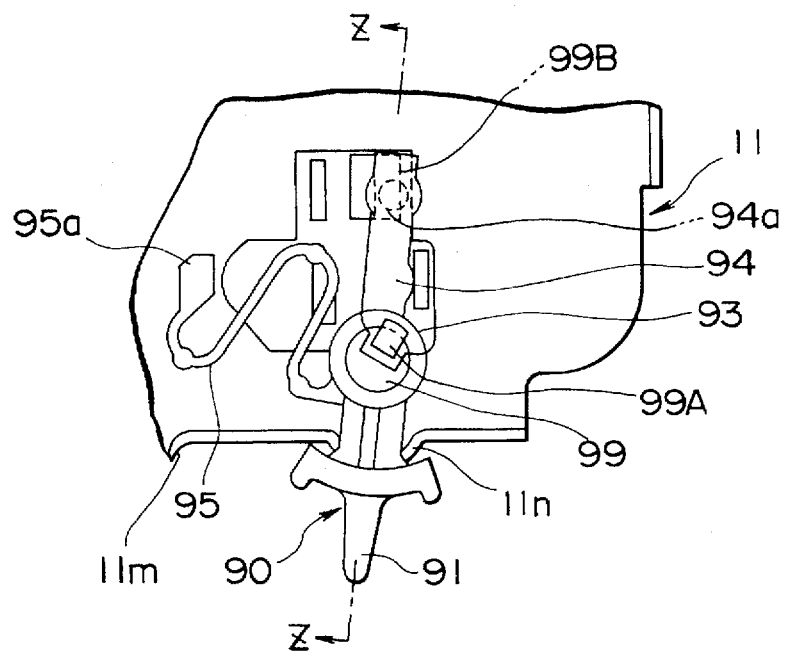
FIG. 16 is a plan view illustrating the construction of a mode-switching operation lever incorporated in the mechanism of the tape recorder.
Figure 17:
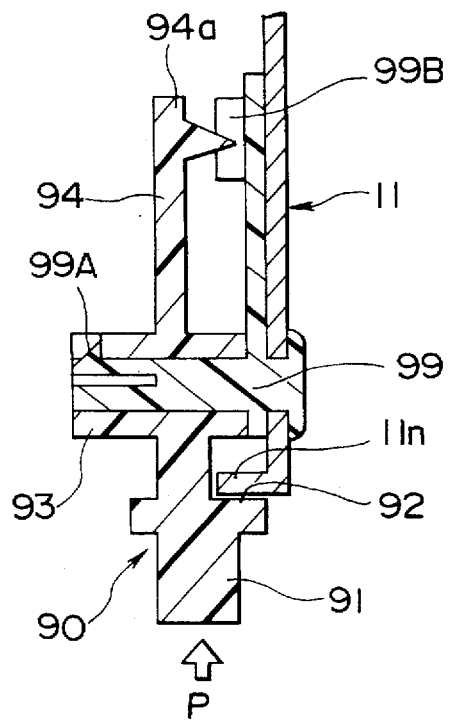
FIG. 17 is a cross-sectional view taken along the line Z—Z of FIG. 16.
Figure 21:
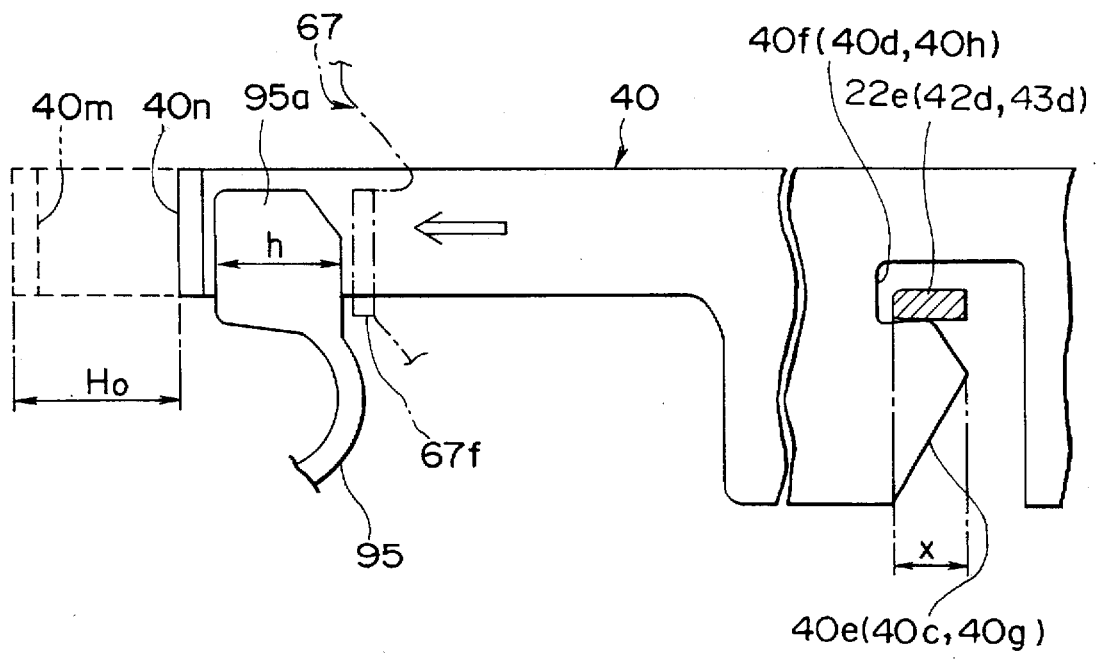
FIG. 21 is an enlarged view explaining the linked relationship between the lock lever and the mode-switching operation lever during the shut-off operation of the tape recorder.
Figure 27:
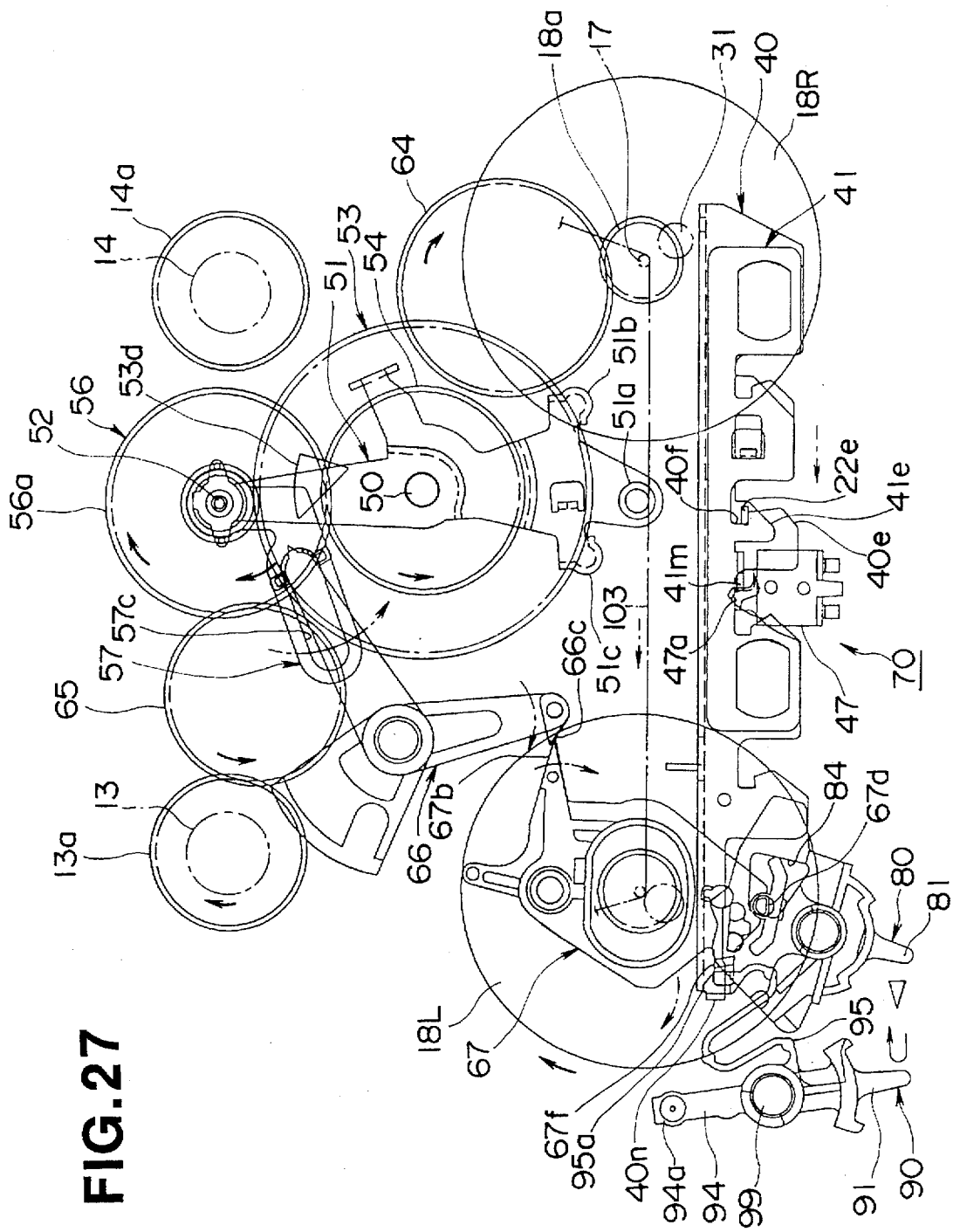
FIG. 27 is an illustration of such a particular state that the magnetic tape is driven in the reverse-rotation running direction in the playback operation in case of switching to the stop mode after the continuous playback from the face A to face B and from face B to face A.

As shown in FIGS. 16 and 17, integrally formed are an operation portion 91 located at the front side of the mode switching operation lever 90, a cylindrical portion 93 located at the center of the mode switching operation lever 90, into which cylindrical portion a support shaft 99 is inserted, a lock portion 94 located at the rear side of the cylindrical portion 93 of the lever 90, and a substantially reversed S-shaped moveable portion 95 located at the right-hand side of the cylindrical portion 93. A concavity 92 into which the bent portion 11n enters, is formed in the position opposing the bent portion 11n of the chassis 11 and between the operation portion 91 of the mode switching operation lever 90 and the cylindrical portion 93. Also integrally formed on the upper face of the lock portion 94 is a conical upright portion 94a which is engaged with either one of both sides of a triangular projected portion 99B which is formed integral with the support shaft 99 and the nail portion 99A. As shown in FIGS. 19 and 27, the nose 95a of the moveable portion 95 is so designed to be inserted into the space defined between the bent piece 40n of the lock lever 40 and the third upright portion 67f of the second detection lever 67, when the running direction of the tape 103 is switched from the reverse playback running state to the auto-stop mode during the playback mode from face A of the tape cassette 100 to face B or during playback mode from face B to face A. As shown in FIG. 21, a stroke Ho, which is required to release the locked state of the lock lever 40 when switching the running direction of the tape 103 from the reverse playback running state to the auto-stop mode, is set to be longer than the minimum stroke x of the lock lever 40 which is required to release the locked state of the respective operation levers 22, 41 and 42. That is, the lock lever 40 slides in the leftward direction by the distance expressed by (Ho-x) depending upon the width h of the nose 95a, after the locked state of each of the operation levers 22, 41 and 42 has been released.

As shown in FIG. 18, an auto-direction mechanism 69 is constructed by the pinch-roller switching lever 24 which switches the positions of the pair of pinch rollers 30 and 31, the cam gear 53 which is driven by the motor 19, the first and second detection levers 66 and 67, and the direction switching operation lever 80 and the like, for the purpose of automatic reversing (auto-direction) of the forward and backward trips (face A ←→ face B) of the magnetic tape 103 at the end of the tape. As shown in FIGS. 25 and 27, an electric power hold mechanism 70 is constructed by the lock lever 40, the switch lever 41, the cam gear 53, the first and second detection levers 66 and 67, and the mode switching operation lever 90, for the purpose of delaying the switched-OFF operation of the power switch 47 (often called, "during shut-off") when switching the running direction of the magnetic tape from the reverse playback running state to the auto-stop mode.

As set forth above, according to the auto-reverse type tape recorder 1 of the embodiment, as seen in FIGS. 4, 22 and 32, the oscillating gear 56 is moved up and down depending on the position of the bent piece 22g formed at the top end of the playback operation lever 22 which is located in the center of the chassis 11 of the mechanism 10, in order to switch between the forward playback (FWD) and the reverse playback (RVS) and between the fast-forward running (FF) and the rewinding (REW). That is to say, when the playback operation lever 22 is pressed against the bias of the torsion spring 23 by pushing the play button 4, the bent piece 22e of he playback operation lever 22 is locked by the hook-shaped portion 40f (for use in the playback operation) of the lock lever 40 and the concavity 41f (for use in the playback operation) of the switch lever 41. At this time, as seen in FIG. 19, the switch lever 41 slides leftward (to the rewind operation lever 43) by the link nail 40k of the lock lever 40, and then the operation portion 47a of the power switch 47 is pressed by the bent piece 41m, thus switching the power source ON. The switched-ON state is held by locking the bent piece 22e of the playback operation lever 22 on the hook-shaped portion 40f of the lock lever 40, and continued until the locked state of the playback operation lever 22 is released by the stop operation lever 44. Owing to the sliding motion of the playback operation lever 22, as shown in FIG. 22, the bent piece 22g formed at the top end of the playback operation lever 22 moves away from the projected portion 56c of the oscillating gear 56, and then the oscillating gear 56 is held at its upper position (the lower position in FIG. 22) by means of the elastic biasing force of the coil spring 58. As a result, the large-diameter gear 56a of the oscillating gear 56 is brought into meshed-contact with the driven gear 54 which is rotatable together with the cam gear 53.

As shown in FIGS. 34 and 35, when the fast-forward operation lever 42 or the rewind operation lever 43 are pressed by means of the buttons 5 or 6, the locked state of the playback operation lever 22, which state is achieved by the lock lever 40, is released, and also in the same manner as the above-noted playback operation lever 22, the lock lever 40 and the switch lever 41 slide leftward, and thus the operation portion 47a of the power switch 47 is pressed, thus switching the power source ON. The switched-ON state is held until the power switch 47 is switched OFF by operating the stop operation lever 44. At this moment, the bent piece 22g of the playback operation lever 22 moves toward the projected portion 56c formed on the upper face of the oscillating gear 56, and thus the oscillating gear 56 moves downward (the upward direction in FIG. 32) against the elastic biasing force of the coil spring 58. As a result, the small-diameter gear 56b of the oscillating gear 56 is brought into meshed-contact with the gear 53b of the cam gear 53.

In the playback state in which the pinch-roller switching lever 24 is pressed by the playback operation lever 22 with the playback operation lever 22 pushed and thus the pinch-roller switching lever 24 moves toward the capstans 16 and 17, the manual operation of the direction switching operation lever 80 permits switching operation from one of the forward (face A) and backward (face B) trips of the magnetic tape 103 to the other. Explaining in more detail as regards the manual reverse by which the tape running direction is manually switchable, in the playback state, the drawing-pressed portion 51a of the FR switching lever 51 is positioned in the C-shaped rear portion 24c of the pinch-roller switching lever 24. As shown in FIG. 25, when the direction switching operation lever 80 is shifted rightward and then the pinch-roller switching lever 24 moves leftward by the direction switching operation lever 80. As a result of this, the FR switching lever 51 oscillates clockwise by means of the drawing-pressed portion 51a, with the result that the oscillating gear 56 supported on the support shaft 52 of the FR switching lever 51 is brought into meshed-contact with the gear 14a of the take-up reel base 14. In contrast, as shown in FIG. 26, when the direction switching operation lever 80 is shifted leftward, the pinch-roller switching lever 24 moves rightward. As a result, the FR switching lever 51 oscillates anti-clockwise by means of the drawing-pressed portion 51a, with the result that the oscillating gear 56 supported on the support shaft 52 of the FR switching lever 51 is brought into meshed-contact with the intermediate gear 65 which is meshed with the gear 13a of the supply reel base 13.

The oscillating gear 56 which has been brought into meshed-contact with the intermediate gear 65 or with the gear 14a of the supply reel base 14, rotates clockwise by means of the driven gear 54 which rotates together with the cam gear 53. In this moment, the rotational force of the oscillating gear 56 is transmitted to the friction lever 57, which is supported on the lower engaged portion 52a of the support shaft 52, by the aid of both the frictional force of the oscillating gear 56 and the elastic biasing force of the coil spring 58. Thus, the cam follower 66d of the first detection lever 66 slides on the elliptical cam portion 53c of the cam gear 53.

Referring now to FIGS. 24 and 26, hereinafter explained is the auto-reversing action (auto direction) in which the forward and backward trips (face A ←→ face B) of the magnetic tape 103 is automatically reversed at the tape end in case that the mode switching operation lever 90 is switched to the double-face playback mode at which the playback is repeatedly performed between faces A and B of the tape cassette 100.

FIGS. 24 and 28 show the forward playback running (FWD) state of the magnetic tape 103. In this case, the direction switching operation lever 80 is held in the rightward position. As shown in FIG. 24, the pinch-roller switching lever 24 is held in the leftward position, and then the right-hand side pinch roller 31 abuts with the right-hand side capstan 17, while sandwiching the magnetic tape 103 therebetween. A slight play is provided between the pinch-roller switching lever 24 and the direction switching operation lever 80 in consideration of a required stroke. As appreciated, since the pinch-roller switching lever 24 is urged to the left side by means of the bias of the torsion spring 28, the operation portion 81 of the direction switching operation lever 80 leftwardly rotates about the support shaft 89, whereas the top end 67b of the second detection lever 67 rotates about the support shaft 63 in the direction indicated by the arrow G1 of FIG. 28, depending on the above-noted play, by means of the elastic biasing force of the torsion spring 68 which spring abuts the right side of the upright portion 82 of the direction switching operation lever 80. At this time, the datum end portion 66c of the first detection lever 66 is positioned below and slightly away from the top end 67b of the second detection lever 67, thus ensuring the positioning required for the direction operation, i.e., the reversing operation from the forward running direction of the magnetic tape 103 to the reverse running direction.

As shown in FIG. 29, in the case that the magnetic tape 103 is wound on the take-up reel base 14 until the tape end has been reached, the gear 14a of the reel base 14 and the oscillating gear 56 stop. In such a stopped state, the cam gear 53 continues to rotate by means of the clutch mechanism 55, with the result that the cam follower 66d of the first detection lever 66 moves toward the substantially triangular-prism shaped convex cam portion 53d of the cam gear 53 by means of reaction of the friction lever 57, and then the cam follower 66d slides along the convex cam portion 53d. As a result of this, the first detection lever 66 rotates clockwise, the second detection lever 67 rotates anti-clockwise, and the direction switching operation lever 80 rotates clockwise.

As set out above, when the running direction of the magnetic tape 103 is switched from the forward playback running direction to the reverse-rotation playback running direction, as seen in FIG. 29, the datum end portion 67c of the second detection lever 67 is moved in the anti-clockwise direction by upwardly pushing the lower side of the top end 67b of the second detection lever via the datum end portion 66c of the first detection lever 66. Thus, the direction switching operation lever 80 moves in the clockwise direction. As indicated in FIG. 29, the pinch-roller switching lever 24 slides rightward, and as a result the left-hand side pinch roller 39 is brought into abutment with the left-hand side capstan 16, with the result that the reversing operation of the tape 103 is completed. At this time, as seen in FIG. 29, the torsion spring 68 generates biasing force, and as a result only the second detection lever 67 can be recovered by means of the biasing force of the torsion spring 68 after the cam follower 66d of the first detection lever 66 passes through the cam portion 53d of the cam gear 53, since the positions of the above-noted torsion spring 68 and the pinch-roller switching lever 24 remain unchanged by means of the torsion spring 28.

FIG. 30 shows the reverse playback running state of the magnetic tape 103. As seen in FIG. 30, after the second detection lever 67 has been returned by means of the elastic biasing force of the torsion spring 68, the cam follower 66d of the first detection lever 66 slides onto the elliptical cam portion 53c of the cam gear 53 by virtue of the friction gear 57. At this moment, by means of the elastic biasing force of the torsion spring 68 which abuts the left-hand side of the upright portion 82 of the direction switching operation lever 80, the operation portion 81 of the direction switching operation lever 80 rotates rightward (viewing FIG. 30) about the support shaft 89 by the slight play defined between the pinch-roller switching lever 24 and the direction switching operation lever 80 for the purpose of the required stroke, whereas the top end 67b of the first detection lever 67 rotates in the direction indicated by the arrow G2 (viewing FIG. 30) about the support shaft 63 by the above-noted slight play. As a result, the datum end portion 66c of the first detection lever 66 is positioned slightly away from the upper side of the top end 67b of the second detection lever 67. In this manner, a required positioning which is necessary for the next reversing operation of the running direction of the tape 103.

During the reverse playback running (RVS) of the magnetic tape 103, as shown in FIG. 30, when the magnetic tape 103 is wound on the supply reel base 13 up to the tape end, the gear 13a of the supply reel base 13, the intermediate gear 65 and the oscillating gear 56 all stop. In the stopped state, the cam gear 53 continues to rotate by means of the clutch mechanism 55, and then the cam follower 66d of the first detection lever 66 moves toward the substantially triangular-prism shaped convex cam portion 53d of the cam gear 53 by virtue of reaction of the friction lever 57, in a manner so as to slide along the cam portion 53d, as seen in FIG. 31. As a result of this, the first detection lever 66 rotates clockwise, the second detection lever 67 rotates clockwise, and the direction switching operation lever 80 rotates counterclockwise.

As shown in FIG. 31, when the running direction of the magnetic tape 103 is switched from the reverse playback running direction to the forward playback running direction, the datum end portion 67c of the second detection lever 67 is moved clockwise by pushing the top end 67b of the second detection lever 67 downwardly from the upper side thereof by the datum end portion 66c of the first detection lever 66. As a result, the direction switching operation lever 80 moves anti-clockwise. As seen in FIG. 31, the pinch-roller switching lever 24 thus slides leftward, with the result that the left-hand side pinch roller 30 moves away from the left-hand side capstan 16, and in lieu thereof the right-hand side pinch roller 31 abuts with the right-hand side capstan 17, and thus the direction operation is completed. At this moment, as seen in FIG. 31, elastic biasing force is produced by the torsion spring 68 which abuts the right side of the upright portion 82 of the direction switching operation lever 80. Thus, only the second detection lever 67 can be recovered to a state indicated in FIG. 28 by means of the elastic biasing force of the torsion spring 68 after the cam follower 66d of the first detection lever 66 passes through the cam portion 53d of the cam gear 53, since the positions of the torsion spring 68 and the pinch-roller switching lever 24 remain unchanged by means of the torsion spring 28.

In this manner, a slight play is provided between the pinch-roller switching lever 24 and the direction switching operation lever 80 for the purpose of the required stroke, and additionally the operation portion 81 of the direction switching operation lever 80 is shifted to the left or to the right by means of the biasing force of the torsion spring 68 which spring abuts with either one of both sides of the upright portion 82 of the direction switching operation lever 80 in turns. The second detection lever 67 can be oscillated clockwise and anti-clockwise by pushing the datum end portion 66c of the first detection lever 66 upward of the lower side of the top end 67b of the second detection lever 67 when the running direction of the magnetic tape 103 is switched from the forward playback running direction to the reverse playback running direction, and by pushing the datum end portion 66c of the first detection lever 66 downward of the upper side of the top end 67b of the second detection lever 67 when the running direction of the magnetic tape 103 is switched from the reverse playback running direction to the forward playback running direction. Therefore, as seen in FIG. 18, there may be provided a new auto-direction mechanism 69 of a comparatively simple construction in which intermediate levers are reduced as much as possible and thus the number of parts and the assembly man-hour is effectively reduced. Additionally, the operational loss can be reduced and the saving of the space occupied by the mechanism can be achieved. Thus, it may be possible to adequately small-size or thin or light-weight the entire size and dimensions of the tape recorder 1.

As shown in FIGS. 19 and 27, hereinafter explained the shut-off function necessary for automatically switching from the reverse playback mode (RVS) to the auto-stop mode (STOP) when switching the mode switching operation lever 90 to the single-face playback mode.

In the case that the running direction of the magnetic tape 103 is switched from the RVS direction to the auto-stop mode during such a single-face playback that the continuous playback is executed from face A of the tape cassette 100 to face B or from face B to face A and then the playback for the face B or the face A terminates, i.e., during so-called shut-off, as shown in FIGS. 19, 21 and 27, the nose 95a of the moveable portion 95 is inserted into the intermediate space between the bent piece 40n of the lock lever 40 and the third upright portion 67f of the second detection lever 67 in advance by shifting the operation portion 91 of the mode switching operation lever 90.

At the tape end with respect to the RVS direction, in the same manner as the direction operation as indicated in FIG. 31, when the magnetic tape 103 is wound on the supply reel base 13 up to the end, the gear 13a of the reel base 13, the intermediate gear 65 and the oscillating gear 56 stop. In such a stopped state, the cam gear 53 continues to rotate by means of the clutch mechanism 55, and thus by means of reaction of the friction lever 57, as seen in FIG. 31, the cam follower 66d of the first detection lever 66 moves toward the substantially triangular-prism shaped convex cam portion 53d of the cam gear 53, and then slides onto the cam portion 53d. As a result of this, the first detection lever 66 rotates clockwise, the second detection lever 67 rotates clockwise, and the direction switching operation lever 80 rotates anti-clockwise.

In the case that the upright portion 67f of the second detection lever 67 is moved clockwise by pushing the datum end portion 67b of the second detection lever 67 downwardly of the upper side by the datum end portion 66c of the first detection lever 66 as seen in FIG. 31, the upright portion 67f of the second detection lever 67 pushes the bent piece 40n of the lock lever 40 leftwards, while sandwiching the nose 95a of the moveable portion 95 of the mode switching operation lever 90, as shown in FIG. 21. Since the sliding amount of the lock lever 40, which amount is necessary for releasing the locked states of the respective operation levers 22, 42 and 43 corresponds to the amount indicated by the character x indicated in FIG. 21, and therefore when the lock lever 40 slides by the amount indicated by x, the locked state of the playback operation lever 22 can be released by means of the lock lever 40. Actually, the lock lever 40 slides in the leftward direction by the amount indicated by (Ho-x) in FIG. 21, after releasing the locked state of the playback operation lever 22. At this time, the link nail 40k of the lock lever 40 is in engagement with the rectangular hole 41k of the switch lever 41 which switches the power switch 47 ON or OFF, thus causing the leftward sliding motion of the switch lever 41 together therewith. As a result of this, as seen in FIG. 19, only during the shut-off, the switch lever 41 continues to push the operation portion 47a of the power switch 47 until the cam follower 66d of the first detection lever 66 gets over the substantially triangular-prism shaped convex cam portion 53d of the cam gear 53 and thus the lock lever 40 is released. Therefore, the power source is never shut off under a condition wherein the cam follower 66d of the first detection lever 66 gets over the substantially triangular-prism shaped convex cam portion 53d of the cam gear 53.

As set forth above, the shut-off timing of the power source can be delayed until the cam follower 66d of the first detection lever 66 moves completely away from the convex cam portion 53d of the cam gear 53. As a result, there is less possibility of greatly increased load applied to the driving mechanism of the motor 19 or the like, when switching ON the power switch 47 by re-pushing the playback operation lever 22 after shut-off operation. Also, there is less possibility of deformation of the first detection lever 66, the second detection lever 67 and the like. Also, there is no occurrence of such an evil that the playback operation lever cannot be operated with the lever 22 locked by the lock lever 40.

As shown in FIGS. 8 and 9, by way of pressing for example, integrally formed at the front end and the lower face of the chassis 11 are a pair of left and right two-stepped drawing-pressed portions 37, 37 each having a large-diameter drawing-pressed portion 37a and a small-diameter drawing-pressed portion 37b and constructing a shaft portion, whereas integrally formed in the middle of the lower face of the chassis are a pair of front and rear small-diameter drawing-pressed portions 38, 38, and the lock lever 40 and the switch lever 41 are mounted on the respective large-diameter drawing-pressed portions 37a, 37a of the pair of drawing-pressed portions 37, 37 in a manner so as to be slidable in the lateral direction, and also the fast-forward running operation lever 42 is installed slidably in the longitudinal direction on the right-hand side small-diameter drawing-pressed portion 37b of the pair of drawing-pressed portions 37, 37 and on the right-hand side small-diameter drawing-pressed portion 38, whereas the rewind-operation lever 43 is installed slidably in the longitudinal direction on the left-hand side small-diameter drawing-pressed portion 37b and on the left-hand side small-diameter drawing-pressed portion 38. Thus, the respective large-diameter drawing-pressed portions 37a, 37a of the pair of drawing-pressed portions 37, 37 serve as a reference guide, thus ensuring the lateral sliding motion of the lock lever 40 and the switch lever 41.

As shown in FIGS. 10 and 11, the fast-forward running operation lever 42 and the rewind-operation lever 43, which levers are slidably supported on the respective small-diameter drawing-pressed portions 37b, 37b of the pair of drawing-pressed portions 37, 37, can be certainly slid in the longitudinal direction by preventing the levers from coming out by way of the burred portions 37c, 37c, and the burred portions 38c, 38c of the pair of drawing-pressed portions 38, 38. As can be appreciated, by means of the burred portions 37c, 37c, 38c and 38c provided at only four locations, the respective operation levers 40, 41, 42 and 43 can be slidably engageable, and thus it is unnecessary to use superabundant shafts and super abundant fastening parts such as E rings. This greatly reduces the number of parts and the assembly man-hour, thus resulting in low production costs as a whole. Furthermore, the respective drawing-pressed portion 37 is composed of the larger-diameter drawing-pressed portion 37a and the small-diameter drawing-pressed portion 37b, and also deep-drawing-pressed, and the drawing-pressed portion 37 containing the burred portion 37c and the drawing-pressed portion 38 containing the burred portion 38c is formed integral with the chassis 11. This enhances a precision of the positioning when mounting the respective operation levers 40, 41, 42 and 43 on the chassis 11. Thus, good assembly man-hour is ensured, and additionally the mechanical strength is enhanced. As appreciated, there are some merits that inexpensive but high-precision tape recorder 1 can be provided.

As shown in FIGS. 13 through 15, the hole 57a provided at one end of the friction lever 57, which is formed of polyethylene terephthalate (PET) into thinned plate, is detachably mounted on the engaged portion 52a of the support shaft 52 of the FR switching lever 51 through the slit 57b. Thus, when assembling the cam gear 56 on the support shaft 52, the one end of the friction lever 57 functions as a retaining washer for the coil spring 58, and also functions as a lever which is capable of transmitting the rotational force produced by frictional engagement with the cam gear 56 to the first detection lever 66.

[0061]

Additionally, since the friction lever 57 is made of PET, it is possible for the lever to be greatly thinned to a thickness of 0.125 mm to 0.188 mm for example. Furthermore, since the PET material of the thickness of 0.125 mm to 0.188 mm exhibits a high flexibility, even though the hook-shaped portion 66e of the first detection lever 66 which hook-shaped portion is coupled with the sot 57c formed in the other end of the friction lever 57, does not exist on the same plane, as shown in FIG. 15, it may be easily assembled and coupled with each other by elastically deforming the other end of the friction lever 57. After assembly, as shown in FIG. 14, since the other end of the friction lever 57 can be recovered to its initial shape, there is less possibility that the slot 57c of the friction lever 57 disconnects from the hook-shaped portion 66e of the first detection lever 66. As set out above, since the hole 57a of the friction lever 57 and the slit 57b function as a retaining washer, it is unnecessary to use a retaining washer as another part. In view of this, the number of parts and the assembly man-hour can be reduced. Such easy assembly may provide an advantageous effect such as improved assembling. Thus, the entire thickness of the tape recorder 1 can be thinned more remarkably.

As shown in FIG. 12, the distance H1 between the lower face of the chassis 11 and the upper face of the printed wiring board 72 is so designed to be equal to 7.1 mm for example, and additionally the concave projected portion 11j of the height (depth) of 3 mm and of the diameter of 6 mm for instance, is deep-drawing-pressed on the lower face and the front-left corner of the chassis 11 by pressing to such a degree that the depth is reached up to a limit of plastic working region. Also integrally formed at the deep-drawing-pressed portion by way of the outsert molding is the cylindrical portion 71 of the height of 7.1 mm and made of resin such as polyacetal or the like. As seen in FIGS. 8 and 12, when threadably engaging the printed wiring board 72 by means of the earth screw 73, the earth pattern 72b of the printed wiring board 72 and the metal chassis 11 are conducted with each other through the earth screw 73, and whereby static electricity caused by the tape-running drive unit can be eliminated and thus electrification can be prevented.

As set forth above, the shaft portion is formed by tapping the screw-threaded portion 11k in the center of the projected portion 11j after pressing the chassis 11, and by outsert-molding the periphery of the tapped portion, it is unnecessary to separately install another part such as a metal board mounting shaft used in the prior art on the chassis 11 by way of burring. As a result, the number of parts and the assembly man-hour can be reduced and thus the entire production costs can be lowered. Furthermore, the concave projected portion 11j and the cylindrical portion 71 are integrally molded on the chassis 11 by pressing and the outsert molding respectively. For the reason set out above, the mechanical strength can be further increased as compared with the conventional apparatus wherein the previously-noted board mounting shaft is fixed onto the chassis 11 by caulking. It may be possible to provide an inexpensive and almost trouble-free tape recorder 1, because the tape recorder has such a strength that the recorder is satisfactorily proof against the impact owing to accidental falling of the tape recorder 1.

As shown in FIGS. 16 and 17, by way of the outsert molding, the support shaft 99 having the nail portion 99A made of synthetic resin such as polyacetal, is integrally molded and downwardly extends at the position opposing the arc-shaped bent portion 11n (from the plan view) bent downwardly into a L-shaped at the front-left edge portion of the chassis 11, the cylindrical portion 93 of the mode-switching operation lever 90, made of synthetic resin, is rotatably supported on the support shaft 99, and the concavity 92 is formed at the position opposing the bent portion 11n of the chassis 11 and between the operation portion 91 and the cylindrical portion 93 of the mode-switching operation lever 90, such that the bent portion is inserted into the concavity. As a result, even in case that the impact force P is applied to the operation portion 91 of the mode-switching operation lever 90 owing to accidental falling of the tape recorder 1 as shown in FIG. 17, the impact force P can be received by the bent portion 11n by way of abutment of the wall surface of the concavity 92 with the bent portion 11n of the chassis 11. Moreover, there is no transmission of the impact force directly to the support shaft 99, because the impact force P applied to the mode-switching operation lever 90 is received by the bent portion 11n of the chassis 11 during accidental falling for example. Thus, a bad influence on the support shaft 99 can be suppressed to a minimum.

As set out above, the bent portion 11n is formed at the front edge portion of the chassis 11 by bending, and the concavity 92 is formed at the position opposing the bent portion 11n and between the operation portion 91 of the mode-switching operation lever 90 and the cylindrical portion 93. Thus, it is possible to certainly prevent damage (such as breakage) to the support shaft 99, resulting from the impact loaded to the mode-switching operation lever 90 due to accidental falling, without changing the construction of components. Also, even if the diameter of the support shaft 99 is decreased, there is less possibility that the support shaft 99 is broken by the impact force P occurring due to the accidental falling. Thus, it may be possible to greatly enhance the strength for the purpose of prevention of breakage of the shaft, without increasing costs of parts. As can be appreciated, the other bent portion 11m of the chassis 11 and an arc-shaped rear wall 81a (see FIG. 6) of the operation portion 81 of the direction switching operation lever 80 are in cooperation with each other to certainly prevent breakage of the support shaft 89, in the same manner as the mode switching operation lever 90.

Figure 37:
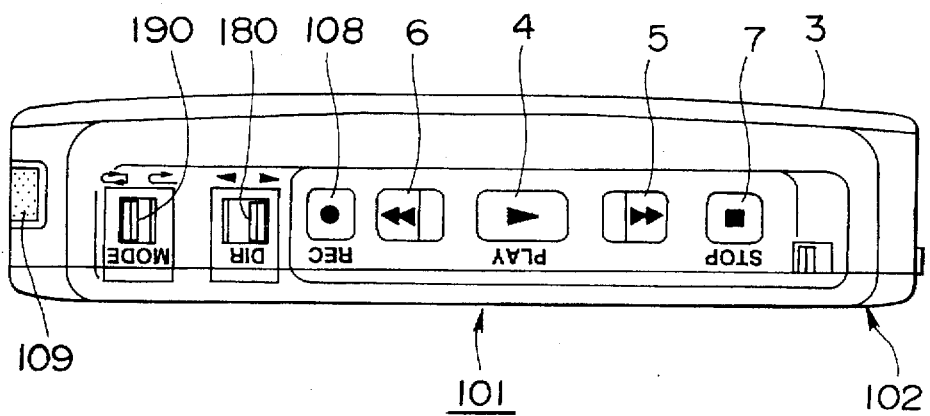
FIG. 37 is a front view illustrating a tape recorder of the other embodiment of the invention.

FIG. 37 shows another embodiment of an auto-reverse tape recorder 101 for use in audio systems. In the tape recorder 101, a record button 108 is provided between the rewind button 106 located at the front face of the cabinet 102 and the direction switching operation lever 180, and a built-in microphone 109 is provided near the left-hand side of the mode-switching operation lever 190, for the purpose of recording and reproduction. The same reference numerals used in the previously-discussed embodiment will be applied to the corresponding elements used in the other embodiments.

Figure 38:
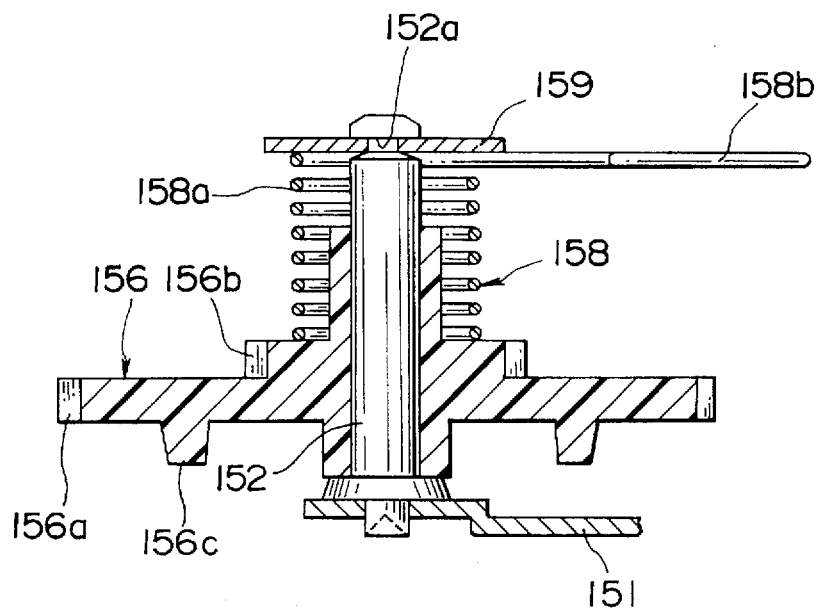
FIG. 38 is a cross-sectional view illustrating the relationship between the oscillating gear and the friction lever in the other embodiment.
Figure 39:
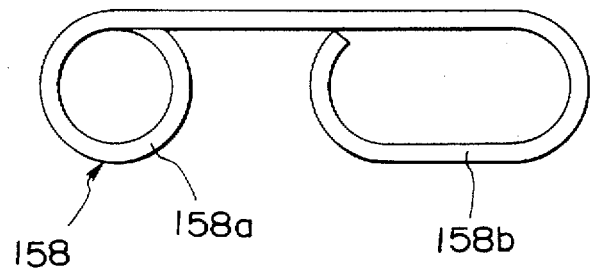
FIG. 39 is a plan view illustrating the structure of the friction lever of the other embodiment of the invention.

FIG. 38 shows an oscillating gear 156 of the rotational-force transmitting mechanism of another embodiment which is applied to the auto-reverse tape recorder 101. The oscillating gear 156 is supported rotatably and slidably up and down on the support shaft 152 standing on the FR switching lever 151, in the same manner as the previously-discussed embodiment. The coiled portion 158a of a coil spring 158 is wound on the periphery of the support shaft 152 of the oscillating gear 156. By means of the biasing force of the coil spring 158 and the frictional force of the oscillating gear 156, the rotational force of the oscillating gear 156 is transmitted to the first detection lever 66 (The explanation related to the first detection lever 66 indicated in FIG. 7 is hereby incorporated). The upper portion of the coiled portion 158a of the coil spring 158 is seated on a washer 159, and also one side end of the upper portion is formed into a hook-shaped armed portion 158b which extends in the direction of the hook-shaped portion 66e in such a manner as to be engaged with the hook-shaped portion 66e of the first detection lever 66.

As shown in FIGS. 37 and 38, the hook-shaped armed portion 158b of the upper portion of the coil spring 158 also functions as a force-transmitting member. Additionally, owing to friction caused by the contact with the oscillating gear, the rotational force is applied to the coil spring 158. When the oscillating gear 156, which is composed of the large-diameter gear 156a and the small-diameter gear 156b for the purpose of changing the gear ratio, moves up and down, the coil spring acts as a return coil spring. As set forth above, since the previously-noted three functions can be achieved by means of only one structural member, i.e., the coil spring 158, in the same manner as the previously-discussed embodiment, the number of parts and the assembly man-hour can be reduced. As seen in FIG. 38, since there is no displacement of the armed portion 158b of the upper portion of the coil spring 158, irrespective of any up-and-down motion of the oscillating gear 156, the space required for the connection of the first detection lever 66 coupled therewith can be reduced to the minimum space, thus small-sizing the entire size of the apparatus. Also, it is unnecessary to precisely control the size and dimensions in a press-fitting process for example.

In the shown embodiments, although the magnetic tape drive according to the present invention is exemplified in terms of an auto-reverse tape recorder which is capable of recording and/or reproducing audio signals, it will be appreciated that the invention may be applied to another recording and/or reproducing apparatus such as a video tape recorder. Furthermore, although a torsion spring is used as a resilient member or a biasing member for returning each operation lever to its initial position, the biasing member is not limited to the torsion spring shown and described herein, but another biasing member such as a tension spring may be used.

What is claimed is:

1. A magnetic tape drive comprising:

a pair of reel-base gears provided on a pair of reel bases, respectively engaging with a pair of reels between which a magnetic tape is wound;

a pair of capstans for driving said magnetic tape in a first running direction and a second running direction opposite said first running direction;

a pair of pinch rollers for driving said magnetic tape in a selected direction of said first and second running directions, while holding said magnetic tape against said capstans by selectively abutting said pair of capstans, said pair of pinch rollers being supported so that said pinch rollers are moveable toward and away from said pair of capstans;

drive means for selectively driving one of said pair of reel-base gears, said drive means selectively meshing with a cam gear and said pair of reel-base gears and having a gear which rotatively drives said meshed reel-base gears;

switching means for switching a running direction of said magnetic tape from one to another of said first and second running directions, said switching means being reciprocated at an end of said magnetic tape so that a first pinch roller of said pair of pinch rollers which abuts a first capstan of said pair of capstans moves away from said first capstan so that a second pinch roller of said pair of pinch rollers which is spaced apart from a second capstan of said pair of capstans abuts said second capstan; and oscillating means for reciprocating said switching means by oscillating said oscillating means at the end of said magnetic tape by said cam gear, wherein said cam gear is shifted from one reel-base gear of said pair of reel-base gears to another reel-base gear at the end of said magnetic tape by said switching means switching the running direction of said magnetic tape, wherein said switching means includes a switching lever being reciprocated by said oscillating means for performing a switching operation at both ends of said switching lever to selectively move said pair of pinch rollers toward and away from said pair of capstans, and wherein said oscillating means includes a first oscillating mechanism engaging a cam portion of said cam gear and oscillated by rotation of said cam gear, and a second oscillating mechanism oscillated by said first oscillating mechanism, and wherein said switching lever is reciprocated by oscillation of said second oscillating mechanism.

2. A magnetic tape drive as claimed in claim 1, wherein said switching means includes hold means for holding said switching lever reciprocated by said oscillating means in a position in which said first pinch roller abuts said first capstan and in which said second pinch roller abuts said second capstan.

3. A magnetic tape drive as claimed in claim 1, wherein said switching means includes a manual switching means for switching the running direction of said magnetic tape to the opposite of said first or said second running directions.

4. A magnetic tape drive as claimed in claim 3, wherein play is provided between said manual switching means and said switching lever.

5. A magnetic tape drive as claimed in claim 3, wherein said switching means includes biasing means for biasing said manual switching means to its initial position, and said manual switching means is oscillated when the running direction of said magnetic tape is switched by said oscillating means.

6. A magnetic tape drive as claimed in claim 1, wherein said drive means includes a power source, transmitting means for transmitting a driving force from said power source to said cam gear to produce a motion of said cam gear from one of said pair of reel-base gears to another, and a friction lever for oscillating said oscillating means while a rotational force of said cam gear is transmitted to said friction lever when the end of said magnetic tape is reached, wherein said friction lever is formed as an elastic member.

7. A magnetic tape drive as claimed in claim 6, wherein said friction lever is formed as a thin plate of polyethylene terephthalate.

8. A magnetic tape drive as claimed in claim 6, wherein said friction lever is formed with a biasing portion to bias said cam gear at one end thereof, and another end of said friction lever is formed of a metal coil spring with an installation portion for installation onto said oscillating means.

9. A magnetic tape drive comprising:

a take-up reel base and a supply reel base;

a pair of capstans for running a magnetic tape in a first running direction of a take-up reel base side or in a second running direction of a supply reel base side, said second running direction opposing said first running direction;

a pair of pinch rollers arranged to abut with or move away from said pair of capstans;

a first gear for rotating one of said take-up reel base and said supply reel base;

a second gear having a cam portion for rotating said first gear;

first switching means for rotatably supporting said first and second gears and moving said first gear toward said one of said take-up reel base and said supply reel base;

first detection means for engaging with said cam portion of said second gear and for detecting a tape end;

second detection means linked to said first detection means for producing an oscillating motion of said second detection means;

second switching means for causing said oscillating motion of said second switching means in a direction substantially equivalent to said first or second running directions by said oscillating motion of said second detection means; and third switching means for switching the positions of said pair of pinch rollers so that said pair of pinch rollers abut with and move away from said pair of capstans alternatively by reciprocating said third switching means in accordance with said oscillating motion of said second detection means;

wherein a selected one of said reel bases is rotatively driven by shifting said first gear which is rotatably supported on said first switching means toward said selected one of said reel bases in accordance with the reciprocating motion of said third switching means, wherein said second detection means is oscillated in a predetermined direction by pushing a datum end portion of said first detection means upwardly from a lower side of a top end of said second detection means when switching said magnetic tape from said first running direction to said second running direction, and by pushing said datum end portion downwardly from an upper side of said top end when switching from said second running direction to said first running direction.

10. A magnetic tape drive as claimed in claim 9, wherein play is provided between said second switching means and said third switching means.

* * * * *